(12) United States Patent
Gallant et al.

(10) Patent No.: US 8,413,306 B2
(45) Date of Patent: Apr. 9, 2013

(54) FASTENER PRODUCTS

(75) Inventors: Christopher M. Gallant, Nottingham, NH (US); William H. Shepard, Amherst, NH (US)

(73) Assignee: Velcro Industries B.V., Willemstad, Curacao ( * ) Notice: Subject to any disclaimer, the term of this patent is extended or adjusted under 35 U.S.C. 154(b) by 1107 days.

(21) Appl. No.: 11/762,401

(22) Filed: Jun. 13, 2007

(65) Prior Publication Data
US 2007/0264469 A1 Nov. 15, 2007

Related U.S. Application Data

(62) Division of application No. 10/997,337, filed on Nov. 24, 2004, now Pat. No. 7,303,711.

(60) Provisional application No. 60/547,212, filed on Feb. 24, 2004, provisional application No. 60/624,216, filed on Nov. 2, 2004.

(51) Int. Cl.
*B32B 3/02* (2006.01)

(52) U.S. Cl.
USPC .................. 24/306; 428/100; 24/446; 24/452

(58) Field of Classification Search .............. 24/306, 24/442, 444, 446, 445, 451, 452; 428/99, 428/100
See application file for complete search history.

(56) References Cited

U.S. PATENT DOCUMENTS

| | | | |
|---|---|---|---|
| 2,153,227 A | 4/1939 | Allstatter | |
| 2,461,201 A | 2/1949 | Ellis | |
| 3,426,363 A * | 2/1969 | Girard | 2/338 |
| 3,590,442 A | 7/1971 | Geisinger | |
| 3,766,608 A | 10/1973 | Fay | |
| 3,780,921 A | 12/1973 | Harp | |
| 4,150,463 A | 4/1979 | Brown | |
| 4,183,121 A | 1/1980 | Cousins | |
| 4,198,734 A | 4/1980 | Brumlik | |
| 4,271,566 A | 6/1981 | Perina | |
| 4,477,950 A | 10/1984 | Cisek et al. | |
| 4,557,024 A | 12/1985 | Roberts et al. | |
| 4,612,718 A * | 9/1986 | Golub et al. | 40/633 |
| 4,657,000 A | 4/1987 | Hepburn | |
| 4,680,838 A | 7/1987 | Astl | |
| 4,775,310 A | 10/1988 | Fischer | |
| 4,863,127 A | 9/1989 | Handler | |
| 4,879,854 A | 11/1989 | Handler | |
| 4,887,338 A | 12/1989 | Handler | |
| 4,887,339 A | 12/1989 | Bellanger | |
| 5,005,242 A | 4/1991 | Kennedy et al. | |

(Continued)

FOREIGN PATENT DOCUMENTS

| | | |
|---|---|---|
| JP | 55-84258 u | 6/1980 |
| JP | 55-122612 u | 9/1980 |

(Continued)

*Primary Examiner* — Robert J Sandy
*Assistant Examiner* — Michael Lee
(74) *Attorney, Agent, or Firm* — Fish & Richardson P.C.

(57) ABSTRACT

A fastener product includes an elongate strap, projections molded of resin extending from a first region of the strap, and a head element molded of resin extending from a second region of the strap. The head element includes a hole sized to receive an end of the strap.

32 Claims, 27 Drawing Sheets

U.S. PATENT DOCUMENTS

| | | | |
|---|---|---|---|
| 5,048,158 A | 9/1991 | Koerner | |
| 5,101,539 A | 4/1992 | Kennedy et al. | |
| 5,168,603 A | 12/1992 | Reed | |
| 5,189,761 A | 3/1993 | Chisholm | |
| 5,208,952 A | 5/1993 | Mintel et al. | |
| 5,216,784 A | 6/1993 | Dyer | |
| 5,260,015 A | 11/1993 | Kennedy et al. | |
| 5,267,945 A | 12/1993 | Doctor et al. | |
| 5,368,549 A | 11/1994 | McVicker | |
| 5,499,859 A | 3/1996 | Angell | |
| 5,537,719 A | 7/1996 | Freed | |
| 5,604,961 A | 2/1997 | Cole | |
| 5,605,373 A | 2/1997 | Wildern, IV et al. | |
| 5,620,769 A | 4/1997 | Wessels et al. | |
| 5,653,004 A | 8/1997 | Russo | |
| 5,657,516 A | 8/1997 | Berg et al. | |
| D389,051 S | 1/1998 | Caveney et al. | |
| 5,704,480 A | 1/1998 | Scholz et al. | |
| 5,722,123 A | 3/1998 | Davignon et al. | |
| 5,766,723 A | 6/1998 | Oborny et al. | |
| 5,802,676 A | 9/1998 | Tolan | |
| 5,826,312 A | 10/1998 | Schroder et al. | |
| 5,827,547 A | 10/1998 | Burchi et al. | |
| 5,882,073 A | 3/1999 | Burchi et al. | |
| 5,945,193 A | 8/1999 | Pollard et al. | |
| 5,953,797 A | 9/1999 | Provost et al. | |
| 5,964,017 A | 10/1999 | Roberts | |
| 5,996,189 A | 12/1999 | Wang | |
| 6,044,525 A * | 4/2000 | Sastre et al. | 24/20 R |
| 6,120,157 A | 9/2000 | Westover | |
| 6,129,970 A | 10/2000 | Kenney et al. | |
| 6,202,260 B1 | 3/2001 | Clune et al. | |
| 6,280,670 B1 | 8/2001 | Buzzell et al. | |
| 6,307,118 B1 | 10/2001 | Reich | |
| 6,317,933 B1 | 11/2001 | Suenaga | |
| 6,347,434 B1 | 2/2002 | Newman | |
| 6,432,339 B1 | 8/2002 | Jens et al. | |
| 6,443,187 B1 | 9/2002 | Wang et al. | |
| 6,467,132 B1 | 10/2002 | Robley | |
| 6,546,603 B1 | 4/2003 | Wang et al. | |
| 6,551,539 B1 | 4/2003 | Leach et al. | |
| 6,588,074 B2 * | 7/2003 | Galkiewicz et al. | 24/586.1 |
| 6,622,346 B2 | 9/2003 | Graham et al. | |
| 6,656,403 B1 | 12/2003 | Clune et al. | |
| 6,668,429 B2 | 12/2003 | Fujisawa et al. | |
| 6,676,674 B1 | 1/2004 | Dudai | |
| 6,684,464 B1 | 2/2004 | Mody et al. | |
| 6,701,580 B1 * | 3/2004 | Bandyopadhyay | 24/16 R |
| 7,162,749 B2 * | 1/2007 | Carbone et al. | 2/400 |
| 7,624,480 B2 | 12/2009 | Coronel | |
| 2001/0013277 A1 * | 8/2001 | Galkiewicz et al. | 100/2 |
| 2002/0078536 A1 | 6/2002 | Martin et al. | |
| 2004/0040125 A1 * | 3/2004 | Schultz | 24/306 |
| 2004/0167456 A1 | 8/2004 | Kingsford et al. | |
| 2006/0032032 A1 * | 2/2006 | Cheng | 24/306 |

FOREIGN PATENT DOCUMENTS

| | | |
|---|---|---|
| JP | 64-2763 u | 1/1989 |
| JP | 45-27594 B | 6/2010 |
| WO | WO 99/10161 | 3/1999 |
| WO | WO 00/00407 | 1/2000 |
| WO | WO 00/07792 | 2/2000 |
| WO | WO 00/18556 | 4/2000 |
| WO | WO 01/12022 | 2/2001 |
| WO | WO 01/37710 | 5/2001 |
| WO | WO 01/58302 | 8/2001 |

* cited by examiner

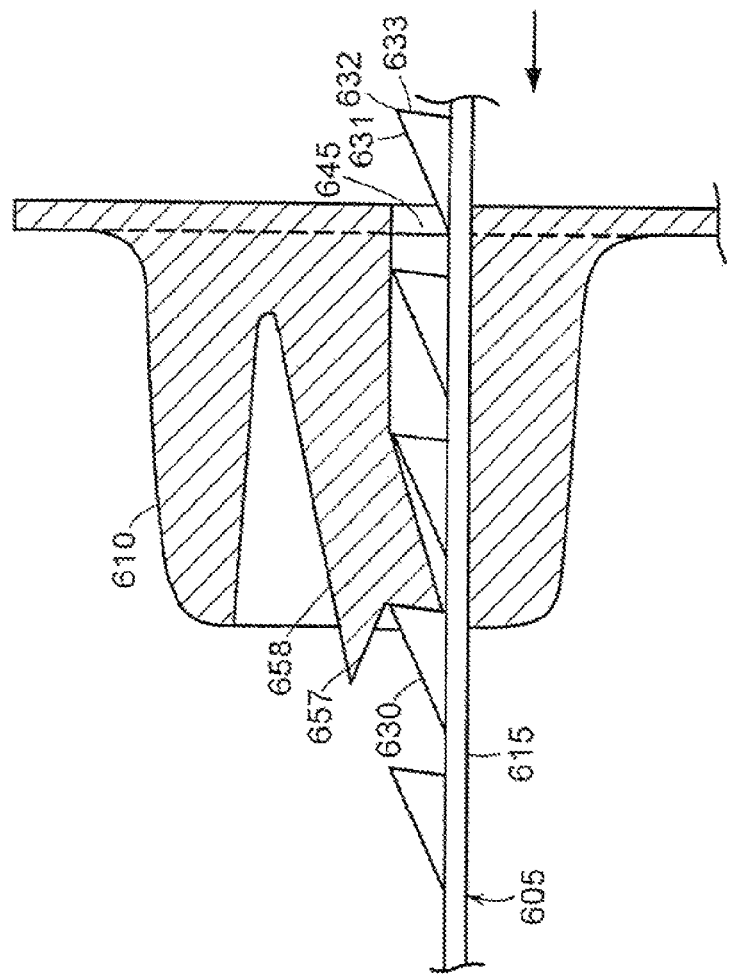
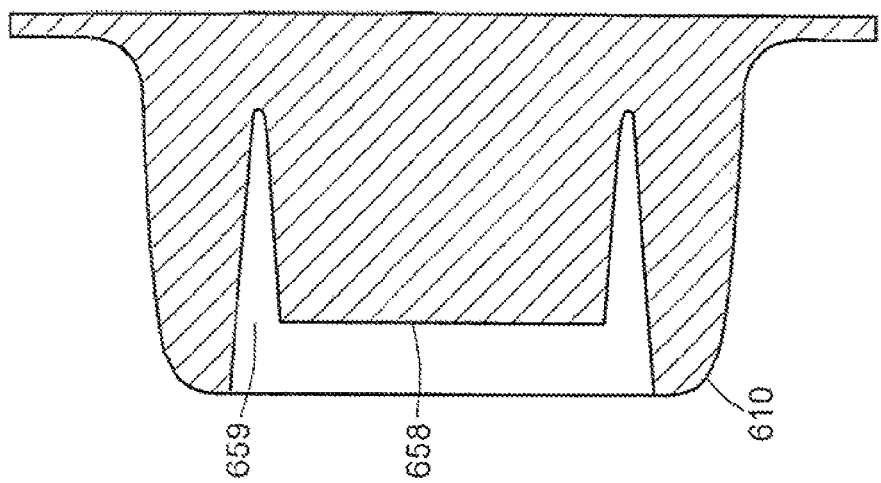

FASTENER PRODUCTS

CROSS-REFERENCE TO RELATED APPLICATIONS

This application is divisional application of U.S. patent application Ser. No. 10/997,337, filed Nov. 24, 2004, now U.S. Pat. No. 7,303,711 which claims the benefit of U.S. Provisional Patent Application Ser. No. 60/547,212, filed Feb. 24, 20041 and which also claims the benefit from U.S. Provisional. Patent Application Ser. No. 60/624,216, filed Nov. 2, 2004. The entire contents of the aforementioned patent applications are herein incorporated by reference.

TECHNICAL FIELD

The invention relates to fastener products.

BACKGROUND

Fastener strips and other types of fastener products have long been used to releasably attach articles to one another. They are modernly used in a vast array of commercial products ranging from automobiles to disposable undergarments. A common use for elongated fastener strips is to retain articles in a bundle. For example, fastener strips can be wrapped around groupings of wires, tubes, or other objects to hold them in an ordered bundle.

For applications like those discussed above, it is sometimes beneficial to attach a structural element to the fastener strip. For example, a D-ring is sometimes attached to a fastener strip so that a free end of the fastener strip may be looped through the D-ring and fastened to a more central region of the fastener strip. It is often possible to secure the strap more tightly by using the D-ring as a leveraging device. As a result, bundles of material may be retained more tightly. Structural elements have occasionally been attached to fastener products for other uses as well.

Conventionally, such structural elements and fastener strips are formed as separate pieces and subsequently attached to one another to form the products discussed above. For example, fastener strips have been sewed and/or adhesively attached to structural elements.

Another type of fastener commonly used to retain articles, for example, is a zip tie. Zip ties are devices that typically include a strap and a head element. Multiple projections extend from the strap, and the head element defines a hole. The projections are arranged along the strap such that they allow the strap to be pulled through the hole in only one direction. When the strap is pulled through the hole in the opposite direction, the projections engage with the head element to prevent further movement of the strap.

Conventional zip ties are typically formed using injection-molding techniques.

SUMMARY

In one aspect, a method of making discrete fastener products includes providing a rotating mold roll having a peripheral surface. The mold roll defines an array of molding cavities extending inwardly from the peripheral surface. The mold roll is positioned adjacent a pressure device to define a pressure nip. At least one of the mold roll and the pressure device define at least one molding recess that is substantially larger than the molding cavities. Resin is introduced to the rotating mold roll. The resin is pressed into the molding cavities to form a multiplicity of discrete projections, and the resin is pressed into the molding recess to form a series of discrete, longitudinally spaced apart structural features. The projections and the structural features are carried on a continuous sheet form base. The resin is removed from the mold roll to expose a continuous preform sheet including the base, the projections, and the structural features. The structural features are arranged along the preform sheet in a longitudinally repeating pattern. The preform sheet is separated into multiple discrete products, each discrete product including an array of the projections and at least one of the structural features.

In some cases, the molding cavities are shaped to form projections with heads overhanging the base. In some cases, the pressure device is a counter-rotating pressure roll. The pressure roll defines the molding recess in many cases. The pressure roll is internally cooled in some cases.

In some cases, the mold roll and the pressure device define multiple molding recesses. The mold roll defines the molding recesses in many cases. In some cases, the molding recess comprises a groove. The groove includes a bottom surface, and multiple protrusions extend from the bottom surface in many cases. In many cases, the protrusions are circumferentially spaced apart.

In some cases, the molding recess comprises a central protrusion.

In many cases, the molding recess comprises multiple discrete depressions arranged in a predetermined configuration. The depressions are arranged in a substantially square arrangement in some cases. The depressions are arranged in a substantially circular arrangement in other cases.

In many cases, the molding recess is defined by the mold roll. The molding recess comprises a continuous groove defined by the peripheral surface of the mold roll in many cases.

In some cases, the mold roll includes an outer edge region and the molding recess extends circumferentially along the outer edge region.

In other cases, multiple molding recesses extend across a transverse direction of the mold roll.

In some cases, the molding recess is defined by an insert retained within at least one of the mold roll and the pressure device. The insert is retained within the mold roll in many cases. The insert extends transversely from a first side of the mold roll to a second side of the mold roll in some cases. The insert is press-fitted within a slot in the mold roll in some cases. The insert defines multiple molding recesses in many cases.

In some cases, the resin is continuously introduced to the mold roll. The resin is introduced into the pressure nip in many eases. The resin is introduced in discrete lanes separated along a transverse direction of the mold roll in some cases.

In many cases, introducing resin to the mold roll includes extruding the resin into the pressure nip.

In other cases, introducing resin to the mold roll includes extruding the resin onto a sheet-form material and continuously introducing the sheet-form material and the resin into the pressure nip. The resin is extruded onto the sheet-form-material in lanes separated along a transverse direction of the sheet-form material in some cases.

In many cases, the projections comprise vertical stems extending from the base. The stems are depressed to form multiple flat-topped fastener elements in some cases.

In some cases, the projections as formed include a stem portion and a head portion, the head portion overlying the base. The head portion overlies the base in at least one discrete direction in many cases. In some cases, the projections have distal ends extending downward toward the base. The head portion overlying the base in multiple directions in some cases.

In many cases, each projection comprises a wedge with an upper surface extending from the base at an angle of between about 5 degrees and, 45 degrees and terminating in a raised distal edge. The raised distal edge extends from the base at an angle between about 45 degrees and 90 degrees in some cases. The raised distal edge extends from the base at an angle of about 90 degrees in some cases. In many cases, the wedges are arranged in a single row along the base.

In many cases, the discrete product includes an elongated strap having a free end. Each structural feature forms a hole sized to receive the free end of the strap in some cases. The structural features include surfaces configured to engage the wedges when the free end of the strap is pulled through the hole in some, cases. In, many cases, the structural feature is arranged at an end of the strap opposite the free end. In some cases, the raised edges of wedges are directed away from the free end of the strap.

In some cases, the projections are fashioned to engage with other like projections.

In some cases, the structural features comprise surfaces defining holes extending into the sheet-form base. In many cases, the holes extend completely through the sheet-form base. The holes are defined by a region of the base that is substantially thicker than the region of the base carrying the projections in many cases. The discrete product includes an elongated strap having a free end, and each structural feature forms a hole sized to receive the free end of the strap in some cases. The structural features comprise surfaces configured to engage the projections when the free end of the strap is pulled through the hole in many cases.

In many cases, the structural features include resin surfaces extending outwardly from the base. The structural features form resilient fingers arranged in associated sets defining a boss sized to be received in a media disc-mounting hole in some cases.

In many cases, the continuous sheet-form base is formed of the resin on the mold roll. The continuous sheet-form base comprises the resin and a continuous sheet-form material attached thereto in some cases. In some cases, the continuous sheet-form base comprises multiple lanes of resin attached to the sheet-form material, the lanes being separated along a transverse direction of the sheet-form material.

In other cases, the method further includes introducing a longitudinally continuous backing material to the mold roll along with the resin. The resin is introduced in discrete regions interconnected by the backing material in some cases. The discrete regions of resin comprise longitudinal bands in many cases. In many cases, the backing material is laminated to the resin under nip pressure. In many cases, the backing material comprises a non-woven knit. The backing material includes a foam material in some cases. The backing material comprises a metallized film in other cases. In some cases, the backing material includes fibers capable of engaging the projections when the product is folded upon itself.

In some cases, the continuous preform sheet includes a continuous resin layer.

In some cases, the continuous pre-form sheet includes a carrier and multiple laterally separated resin bands.

In other cases, the continuous pre-form sheet includes lateral rows of structural features.

In some cases, the continuous pre-form sheet includes longitudinal bands of projections.

In many cases, the continuous pre-form sheet includes at least one longitudinal lane of structural features. The continuous preform sheet includes lateral bands of projections in some cases.

In many cases, the structural features are longitudinally separated by a common distance along the sheet.

In some cases, separating the fastener sheet includes, cutting the sheet. The sheet is conveyed through a cutter that is controlled to intermittently cut the sheet as the sheet is conveyed in many cases. In some cases, the cutter comprises a roll having cutting blades configured to perforate the sheet in predetermined regions. In some cases, the sheet is cut along its transverse direction. In other cases, the sheet is cut along its longitudinal direction.

In some cases, the method further includes weakening the sheet to define boundaries along which the sheet will be separated. In many cases, weakening the sheet includes perforating the sheet in predetermined regions. Perforating the sheet includes conveying the sheet between a cutting roll and a support roll, the cutting roll having protrusions extending from a peripheral surface in many cases.

In some cases, the method further includes spooling the sheet for transport.

In some cases, the method further includes introducing a loop material into the nip, the loop material being capable of engaging the projections when the product is folded upon itself. The loop material is introduced into a central region of the nip in many cases.

In some cases, the method also includes, pressing the resin into a second molding recess defined by at least one of the mold roll and the pressure device to form a second structural feature carried by the sheet-form base. In some cases, at least one of the mold roll and the pressure device define multiple second molding recesses. In some embodiments, the mold roll defines the second molding recesses. The second molding recess includes a groove in many cases. In some cases, the groove includes a bottom surface, and multiple protrusions extend from the bottom surface. In some cases, the protrusions are circumferentially spaced apart. The second molding recess comprises multiple depressions arranged in a predetermined configuration in some cases. The multiple depressions are arranged to form ribs in many embodiments. The ribs extend longitudinally on the sheet-form base in some cases.

In some embodiments, the second molding recess is defined by the mold roll. In some cases, the second molding recess comprises a continuous groove defined by the peripheral surface of the mold roll. In some cases, multiple second molding recesses extend across a transverse direction of the mold roll.

The second molding recess is defined by an insert retained within at least one of the mold roll and the pressure device in some cases. The insert is retained within the mold roll in many cases. The insert extends transversely from a first side of the mold roll to a second side of the mold roll in some embodiments. In some cases, the insert is press-fitted within a slot in the mold roll. The insert defines multiple molding recesses in some cases.

In some embodiments) the second molding recess is positioned adjacent the first molding recess.

In some cases, the second molding recess includes multiple circumferential channels defined by the mold roll to form longitudinally extending ribs.

The second structural feature, in some embodiments, has a thickness at least as great as a thickness of the first structural feature.

In another aspect, a fastener product includes an elongate strap having a first end and a second end. An array of fastener projections is molded of resin encapsulating features of the strap in a first region. A head element is molded of resin encapsulating features of the strap in a second region. The head element includes surfaces defining a hole sized to receive the second end of the strap. A backing material is permanently attached to and overlying a back surface of the strap.

In some cases, the strap includes a continuous resin layer interconnecting the projections and the head element. The head has a thickness greater than a thickness of the strap in many cases. The head and strap form a unitary structure of molded resin in some cases.

In some cases, the head includes a protrusion configured to engage the projections when the second end of the strap is pulled through the hole defined by the head.

In many cases, the backing material exhibits elastic characteristics.

In some cases, at least one resin region is permanently attached to the backing material. The projections extend from the resin region in many cases. The head is formed of resin in many cases. The stems are depressed to form multiple flat-topped fastener elements in some cases.

In many cases, the projections include a stem portion and a head portion, the head portion overlying the strap. The head portion overlies the strap in at least one discrete direction in many cases. The head portion has a distal end extending downward toward the strap in some cases. The head portion has multiple distal ends extending downward toward the strap in, some other cases. In some cases, the head portion overlies the strap in multiple directions.

In some cases, each projection, comprises a wedge with an upper surface extending from the strap at an angle of between about 5 degrees and 45 degrees and terminating in a raised distal edge. The wedges are arranged in a single row along the strap in many cases. The wedges are arranged longitudinally along the strap in some cases. In some cases, the raised edges of the wedges are all directed away from the free end of the strap.

In some cases, the projections are fashioned to engage with other like projections.

In some cases, the hole extends completely through the strap and the backing material.

In many cases, the head element is substantially thicker than the strap.

In many cases, the backing material is laminated to the strap. The backing material comprises a knit material in many cases. The backing material comprises a foam material in many other cases. In still other cases, the backing material comprises a metallized film. In many cases, the backing material includes fibers capable of engaging the projections when the product is folded upon itself.

In some cases the backing material is attached to a first, surface of the strap and a loop material is attached to a second surface of the strap.

In another aspect, a preform fastener product sheet includes a continuous sheet-form strap. An array of projections extend from the sheet-form strap. The projections are integrally attached to the strap. Multiple structural features extend from the sheet form strap. The structural features are integrally attached to the strap. The strap interconnects the structural features and the projections. The sheet includes frangible parting lines between the regions defining multiple discrete fastener products. Each discrete product includes at least one of the structural features and at least one of the projections.

In yet another aspect, a method of making discrete fastener products includes providing a rotating mold roll having a peripheral surface. The mold roll defines an array of molding cavities extending inwardly from the peripheral surface. The mold roll is positioned adjacent a pressure device to define a pressure nip. Resin is introduced to the rotating mold roll. The resin is pressed into the molding cavities to form a multiplicity of discrete projections. The projections are carried on a continuous sheet-form base. The resin is removed from, the mold roll to expose a continuous preform sheet carrying the projections. Multiple, longitudinally separated slots are created within the preform sheet. The preform sheet is separated into multiple discrete products. Each discrete product includes an array of the projections and at least one of the slots.

In another aspect, a fastener product includes an elongate strap having a first end and a second end, an array of projections molded of resin encapsulating features of the strap in a first region, a head element molded of resin encapsulating features of the strap in a second region and a band of resin molded of resin encapsulating features of the strap in a discrete region spaced apart from the head element. The resin band stiffens the strap in the discrete region. The head element includes surfaces defining a hole sized to receive the second end of the strap.

In some embodiments, the strap comprises a continuous resin layer interconnecting the projections, the head element, and the resin band.

In some embodiments, the resin band has a thickness of about 0.05 inch to 0.20 inch. The resin band and the strap form a unitary structure of molded resin in some cases.

In some embodiments, the fastener product also includes a loop material attached to the strap, and configured to engage the projections. The projections are hooks in some cases.

In some cases, the strap comprises at least one resin region permanently attached to a backing material. The backing material exhibits, elastic characteristics in some embodiments. The projections extend from the resin region in some cases. The backing material, in some embodiments includes fibers capable of engaging the projections when the product is folded upon itself. In some cases, the head element extends from the resin region. The resin band extends from the resin region in some embodiments.

In some cases, the projections comprise vertical stems extending from the strap. The stems, in some embodiments, are depressed to form multiple flat-topped fastener elements.

In some embodiments, the projections, include a stem portion and a head portion overlying the strap. The head portion, in some cases, overlies the strap in at least one discrete direction. The head portion has a distal end extending downward toward the strap in some cases. The head portion, in some embodiments, has multiple distal ends extending downward toward the strap. The head portion overlies the strap in multiple directions in some cases.

In some embodiments, the projections are fashioned to engage with other like projections.

In some cases, the hole extends completely through the strap.

In some embodiments, the fastener product also includes a backing material attached to the strap. In some cases, the backing material is laminated to the strap. In some cases, the backing material includes a foam material.

In some cases, the resin band comprises a plurality of nibs.

In some embodiments, the resin band extends transversely on the strap.

In some cases, the fastener product also includes a loop material attached to the strap. In some embodiments, the projections comprise hooks configured to engage with the loop material.

In another aspect, a body part of a user is stabilized by providing a splint device having a strap including a substrate, a rigid support member extending across the strap and formed of resin solidified to encapsulate surface features of the substrate, and fastener projections extending from the substrate in a first region. The substrate carries engageable loops in at least a second region. The strap is wrapped around the body part such that the support member extends along the body part and is arranged to resist motion of the body part. The fastener projections releasably engage the engageable loops to secure the strap around the body part.

In some embodiments, the body part is aligned substantially about a longitudinal axis of the rigid support member.

In some embodiments, the body part is selected from the group consisting of a finger and a toe. In some embodiments, the body part is selected from the group consisting of a plurality of fingers and a plurality of toes.

In some embodiments, the elongate strap exhibits elastic properties.

In some cases, the fastener projections include a stem portion and a head portion, and the head portion overlies the strap.

In some cases, the rigid support member defines a hole sized to receive a first end of the strap.

In some embodiments, the rigid support member is sufficiently rigid to resist flexion of the body part when held against the body part. In some embodiments, the rigid support member has a stiffness of at least about 15 lb/in. In some embodiments, the strap has a Gurley stiffness of no greater than about 1000 milligrams.

In some cases, the rigid support member has a thickness of about 0.050 in. to about 0.200 in.

in another aspect, body parts are grouped by providing an elongate strap defining a hole. The strap includes a substrate having a plurality of fastener projections extending from a first region. The substrate carries engageable loops in at least a second region. The first and second body parts are inserted into the hole defined by the strap. The strap is wrapped about the first and second inserted body parts. The fastener projections are releasably engaged to the engageable loops to secure the strap about the first and second inserted body parts.

In some embodiments, the body parts are selected from the group consisting of fingers and toes.

In some embodiments, the elongate strap exhibits elastic properties.

In some embodiments, a third region of the strap is permanently attached to a fourth region of the strap to define the hole. In some embodiments, the third region is bonded to the fourth region.

In yet another aspect, a splint includes an elongate, flexible strap carrying engageable loops din a first region, an array of fastener projections with stems molded of resin encapsulating features of the strap in a second region, and a rigid, stiffening band extending across the strap in a discrete region thereof. The band includes resin encapsulating features of the strap in the second region. The stiffening band is of sufficient stiffness to resist bending of a body part wrapped by the splint.

In some embodiments the strap has a Gurley stiffness of no greater than about 1000 milligrams, and the stiffening band has a stiffness of no less than about 15 lb/in.

In some cases, the stiffening band has a thickness of about 0.050 in. to about 0.200 in.

In some embodiments, the splint also includes a head element molded of resin encapsulating features of the strap in a third region, the head element defining a hole sized to receive the strap.

In some embodiments, the splint includes a backing material attached to the strap. In some embodiments, the backing material comprises a foam material.

In some cases, the strap exhibits elastic properties.

In some embodiments, the fastener projections are configured to engage, with the engageable loops to secure the splint around the body part.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 15A is a cross-sectional view of the head element of FIG. 13.

FIG. 15B is a partial cross-sectional view of a fastener product having a releasable retaining arm in a fastened position.

Like reference symbols in the various drawings, indicate like elements.

DETAILED DESCRIPTION

Figure 1:
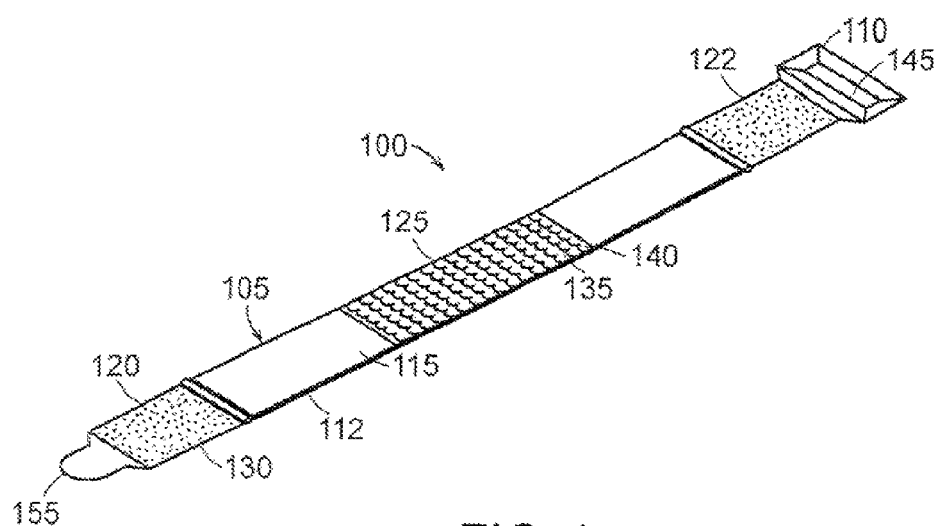
FIG. 1 is a perspective view of a fastener strap with an integral head element.
Figure 1A:
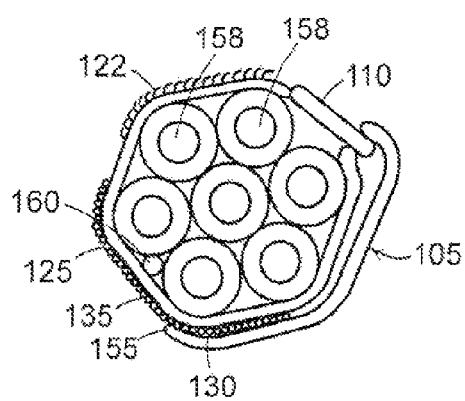
FIG. 1A shows the strap of FIG. 1 wrapped about a bundle of wires.

Referring to FIG. 1, a fastener product 100 includes an elongate fastener strap 105, a head element 110, and a backing material 112. The fastener strap 105 is adapted to cooperate with the head element 110 such that the fastener product 100 can be wrapped around a group of articles and fastened to retain the articles in a bundle, as shown in FIG. 1A, for example. Other uses are also contemplated. As discussed in more detail below, a continuous molding process can be employed to produce the fastener product 100 and other fastener products having fastener elements and structural features extending from a base.

The fastener strap 105 includes a continuous resin base 115 permanently attached to the backing material 112. Multiple fastener elements or hooks 130 extend from the resin base 115 in first fastening regions 120, 122 and multiple fastener elements or loops 135 extend from the base 115 in a second fastening region 125. The hooks 130 in this case, are designed to engage the loops 135 to provide fastening ability. Therefore, when the fastening strap 105 is folded over upon itself such that one of the first regions 120, 122 is brought into contact with the second region 125, the hooks 130 engage the loops 135 to retain the fastener strap in the folded position.

The first fastening regions 120, 122 and the second fastening region 125 can be positioned at various different locations of the strap. For example, the first regions can be located at a central portion of the strap and the second region can be located at the end portion. In some embodiments, the strap can include hooks on the first region 120 and the second region 125.

The fastener elements 130 in the first regions 120, 122 are J-shaped hooks and the fastener elements 135 in the second, region 125 are loops, extending from a loop material 140 that is attached to the base 115. The fastener elements 130, alternatively, can be any suitably shaped element capable of engaging the fastener elements 135, and vice versa. In other embodiments (not illustrated), the fastener elements 130 are, mushroom-shaped elements, flat-top-shaped elements, stem-shaped elements, or loops, for example. Similarly, rather than being loops, the fastener elements 135 can be hooks, mushroom-shaped elements, flat-top shaped elements, or stem-shaped elements, for example. In some embodiments, the fastener elements 130, 135 can be of like shape such that they are configured to engage one another. These types of fastener elements are commonly known as self-engaging fastener elements. Common examples of male self-engaging fastener elements include mushroom-shaped elements. Although, other forms of self-engaging fastener elements are also contemplated.

The resin base 115 extends continuously along the fastener strap 105. The head element 110 is, molded of resin and formed integrally with the resin base 115 of the fastener strap 105. In other embodiments, the resin base 115 can include discrete lanes of resin attached to the backing material 112 in spaced apart regions. In such cases, the head element 110 can be attached to the strap 105 by the backing material 112, rather than being integrally formed with the resin base 115 of the strap 105.

The head element 110 is substantially thicker than the fastener strap 105. As a result, the fastener strap 105 is much more flexible than the head element 110. This flexibility allows the fastener strap 105 to be wrapped around objects. It further allows the strap 105 to be bent or folded over upon itself. Due to the thickness of the head element 110, it is capable of resisting relatively strong forces imparted by the strap without bending or breaking.

The head element 110 defines an aperture or hole 145 sized to receive a free end 155 of the fastener strap 105. The hole 145 extends from a top surface of the head 110 completely through to the bottom surface. The free end of the fastener strap 105 can be pulled through the hole 145. After being inserted through the aperture 145, the fastener strap 105 can be folded upon itself such that the hook-shaped fastener elements 130 of region 120 engage the loops 135 to fasten the strap 105 around the head element 110. This allows the product 100 to form a secured enclosure around a group of articles to retain the articles in a bundle, for example.

In some embodiments, the fastener strap has a width between about 0.5 inch (1.27 cm) and 2 inches (5.08 cm), and a length between about 5 inches (12.7 cm) and 36 inches (91.44 cm). The head typically has a width that is between about 0.01 inch (0.025 cm) and 0.02 inch (0.051 cm) greater than the width of the strap. Thus, in many embodiments, the width of the head is between about 0.52 inch (1.321 cm) and 2.02 inches (5.131 cm). The cross-sectional area of the structure defining many head elements is rectangular having a thickness or height of about 0.125 inch (0.318 cm) and a width of about 0.25 inch (0.635 cm).

The strap and head element dimensions discussed above are merely used to describe particular embodiments. Straps and head elements of various other shapes and sizes can be produced. The head elements can be formed to be rectangular, square, triangular, circular, elliptical, or D-ring shaped, for example. Similarly, the cross-sectional area of the structure that defines the head element can be square, rectangular, circular, or elliptical, for example. In some cases, a relatively flat tab can be molded to extend from the head element to allow the user to identify the contents retained by the product, for example. The tab can also be equipped with an aperture to allow the user to hang the product from a nail or hook, for example. In some cases, the head element can include multiple apertures. For example, the head element can include two apertures separated by a cross-bar such that the strap can be looped around the cross-bar. Furthermore, the aperture or apertures within the head element can be of various shapes and sizes.

In many embodiments, the head element 110 and the fastener strap 105 (or the base 115 attached to the fastener strap 105) are formed from the same thermoplastic material. Suitable thermoplastic materials include, for example, polypropylene, polyethylene, and polyamides. It is contemplated that the head 110 and the fastener strap 105 can be formed of other suitable materials.

The backing material 112 is permanently attached to a bottom surface of the strap 105 opposite the surface from which the hooks 130 and loops 135 extend. More specifically, it is permanently attached to the continuous resin base 115 of the strap. It is also attached to a bottom surface of the head element 110. During use the backing material, rather than the resin base 115, contacts the article about which the fastener product 100 is wrapped. The backing material 112 can be one of various suitable materials including, for example, non-woven knit, foam, and metallized film.

The backing material 112 can serve multiple different purposes. For example, the backing material 112 can add support and strength to the resin base 115 from which the fastener elements 130) 135 extend. In some embodiments, as noted above, the resin base 11 includes multiple discrete lanes of resin attached to the backing material 112, rather than a continuous sheet or layer of resin. The backing material 112 acts as a substrate interconnecting the discrete resin lanes and the head element 110 in such cases. The backing material 112 can be any of various suitable materials including, for example, elastic non-woven materials, elastic knit materials, thermoplastic elastomers, and thermoplastic urethanes. This can result in a stretchable strap, which can improve fastening or retaining ability of the product 100. It is not necessary for the backing material 112 to exhibit elastic characteristics. In some embodiments, the backing material 112 that interconnects the lanes of resin can be one of various suitable loop materials. In those cases, it would be unnecessary to laminate additional loop material to the strap. When the strap is folded upon itself, its hooks could engage the loop material that is exposed between the lanes of resin to enclose the strap in the fastened position.

The backing material can also help to prevent the product 100 from causing damage to the article that is being retained. The foam backing material can be especially beneficial when the fastener product 100 retains a delicate object or objects. More specifically, the foam material can help to ensure that the object or objects are not scratched or otherwise damaged. Many non-woven and knit materials can provide the same effect. The metallized film can be useful when electrical wires 158, for example, are bundled together, as in FIG. 1A. In such a case, the metallized film can act to collect and ground fields about the conductors, to dissipate stray eddy currents. For example, the metallized film or other conductive substrate on the back of the strap can conduct eddy currents directly into a grounding wire 160 of the bundle, or through a grounding cable clipped to the exposed end 155 of the strap.

In some embodiments, the backing material 112 can be attached only to the strap 105 and not the head element 110. In other embodiments, the product can include no backing material.

Referring again to FIG. 1A, during use, the fastener strap 105 is wrapped around a group of articles and a free end 155 of the fastener strap 105 is inserted through the aperture 145. The fastener strap 105 is then pulled through the aperture 145 to bundle the group of articles. The fastener strap 105 is then folded over upon itself such that the hooks 130 of region 120 are brought into contact with the loops 135 to restrain the fastener strap 105 from slipping back through the aperture 145. This in turn insures that the group of articles remains securely bundled.

In order to release the bundle of articles 50, the fastening process is reversed. The hooks 130 are disengaged from the loops 135 by pulling the free end 155 of the strap 105 away from the bundle of articles. The free end 155 of the strap 115 is then pulled back through the aperture 145 such that the fastener product 100 once again assumes the position shown in FIG. 1. This causes the bundle of articles 50 to be released.

Other uses are contemplated for the product 100. For example, it can be wrapped around both an article and a beam to suspend the article from the beam. The product 100 can be constructed to withstand multiple uses. Alternatively, it can be constructed in such a way that requires its disposal after each use.

Figure 2:
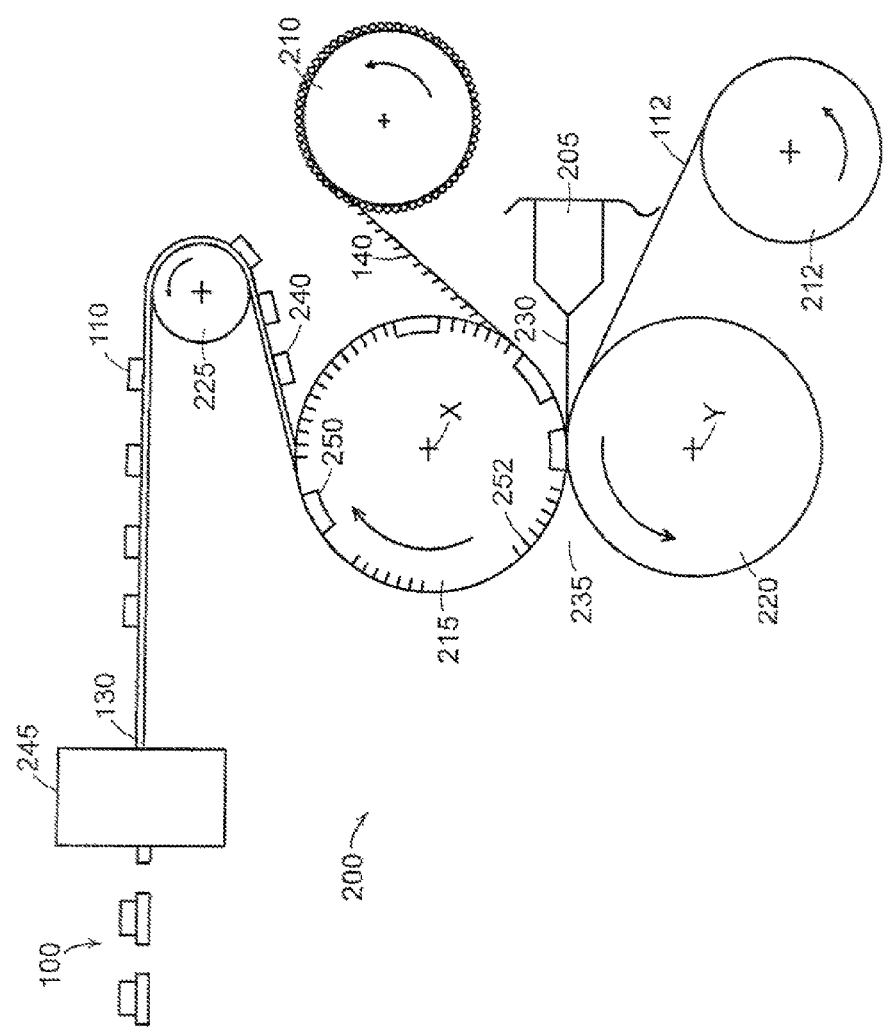
FIG. 2 illustrates a method and apparatus for producing the fastener product of FIG. 1.

FIG. 2 illustrates a method and apparatus 200 for making the above-described fastener product 100. The apparatus 200 includes an extruder 205, a roll 210 of loop material 140, a roll 212 of backing material 112, a mold roll 215, a counter-rotating pressure roll 220, a stripping roll 225, and a separating device 245. The extruder 205 extrudes a sheet of resin 230 into a pressure nip 235 formed between a peripheral surface of the mold roll 215 and the pressure roll 220. At the same time, the loop material 140 and the backing material 112 are introduced into the pressure nip 235. The resin 230, the backing material 112, and the loop material 140 are then conveyed around the mold roll 215 toward the stripping roll 225. The stripping roll 225 strips the resin 230, the loop material 140, and the backing material 112 from the mold roll 225 to expose a continuous fastener product sheet 240. The fastener product sheet 240 is then conveyed through a separating device 245 where it is separated into multiple, discrete fastener products 100 having hook regions and loop regions.

The extruder 205, as noted above, extrudes a sheet of molten resin 230 into the pressure nip 235. A die can be attached to the outlet of the extruder to affect the manner in which the resin is extruded. For example, the die can include a continuous slot that allows the resin to be extruded in a continuous sheet. Alternatively, the die can include multiple discrete slots causing the resin to be extruded in multiple discrete lanes.

The molten resin 230 can be one of various suitable materials capable of being molded and retaining the molded shape. Suitable materials include, for example, thermoplastic materials, such as polypropylene, polyethylene, and polyamides. Furthermore, different materials can be introduced into different areas of the nip 235 depending on the desired fastener product characteristics. For example, if it is desired to produce a product having a head element and fastener projections that embody different physical characteristics (e.g., rigidity, hardness, etc.), then different materials can be introduced to the corresponding regions of the mold roll responsible for forming the head elements and the fastener projections.

Figure 3:
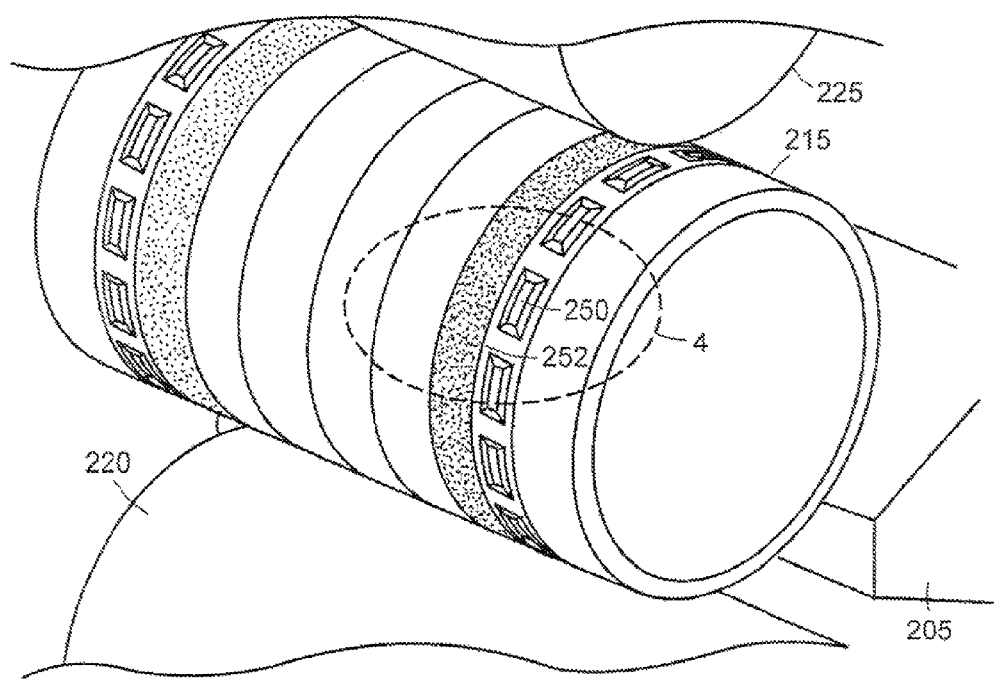
FIG. 3 is a perspective view of the mold roll of the method and apparatus shown in FIG. 2.
Figure 4:
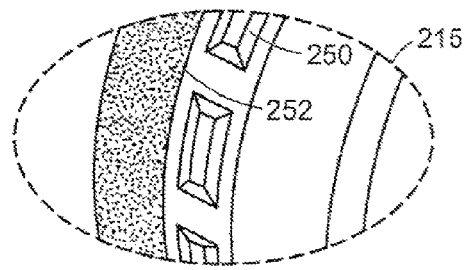
FIG. 4 is an enlarged view of area 4 of FIG. 3.

Referring to FIGS. 3 and 4, them old roll 215 defines multiple molding cavities 252 and molding recesses 250. The molding recesses 252 are located near the edge regions of the mold roll 215. The molding cavities 252 are positioned adjacent the molding recesses 250 nearer a central portion of the mold roll 215. The molding cavities 252 are hook-shaped. Therefore, when resin is introduced into the cavities 252 and cooled, the multiple hook-shaped fastener elements 130 are molded. The cavities 252 can be restricted to desired regions of the mold roll 215. For example, regions of cavities can be circumferentially separated along the mold roll by flat regions to produce alternating regions of projections and flat base regions. The molding recesses 250 are rectangular and each has an unrecessed center portion. Thus, when resin is introduced into the molding recesses 250 and allowed to cool, the multiple rectangular structural features or head elements 110 having recessed center portions are molded. Each of the molding recesses 250 is spaced along the circumferential surface of the mold roll 215 in order to form the molded head elements 110, which are longitudinally separated along the fastener product sheet 240 or which define holes 145 that are longitudinally separated along the fastener product sheet 240.

In other embodiments, the molding cavities 252 and the molding recesses 250 can be of various other shapes and sizes. For example, the molding cavities 252 can be hook-shaped, mushroom-shaped, stem-shaped, or other suitable shapes depending on the desired shape of the projection to be molded. The molding recesses 250, which are typically larger than the molding cavities 252, can be square, oval, circular, or other shapes depending on the desired shape of the structural feature to be molded.

Referring again to FIG. 2, the pressure roll 220 has a substantially smooth peripheral surface (i.e., no protrusions or recesses). In other cases, the pressure roll can include protrusions to facilitate conveyance of the resin 230 and backing material 112 through the pressure nip 235 (i.e., the region between adjacent peripheral surfaces of the rolls), for example. The mold roll 215 and pressure roll 220 are positioned adjacent one another with their axes of rotation X and Y, respectively, substantially aligned. As a result of the rotation and alignment of the rolls 215, 220, a large amount of pressure is created in the pressure nip 235. When the resin 230 is introduced into the pressure nip 235 the pressure forces some of the resin 230 into the molding recesses 250 and the molding cavities 252 to form the heads elements 110 and the fastener projections 130, respectively. The remainder of the resin 230 is compressed between the peripheral surface of the mold roll 215 and the pressure roll 220 to form the resin base 115 (shown in FIG. 1). As noted above, the resin base 115 interconnects each of the fastener projections 130 and the head elements 110 in this embodiment (i.e., each of the fastener projections and the head elements extend from the common resin base).

The thickness of the base 115 depends on the separation distance between the peripheral surface of the mold roll 215 and the pressure roll 220, among other things. Typically, the thickness of the base 115 increases as the separation distance between the mold roll 215 and pressure roll 220 increases. Because the desired thickness of the base 115 varies depending on the intended use of the product, the desired separation distance between the rolls 215, 220 can vary.

In some embodiments, as discussed below, the pressure roll 220 can include molding cavities and/or molding recesses in addition to or instead of the mold roll 215. As a result, fastener products can be produced that include fastener projections 130 and structural elements 110 extending from one or both sides of the base 115. Alternatively, fastener products can be produced having one of the fastener projections 130 and the structural elements 110 extending from one surface and the other extending from the opposite surface.

Referring again to FIG. 2, the loop material 140 is also introduced into the pressure nip 235 along with the resin 230 and the backing material 112. The loop material 140 is introduced to a central region of the mold roll 215 to avoid impeding the flow of the resin 230 into the molding cavities 252 and the molding recesses 250, which are located nearer the outer edge regions of the mold roll 215. In other embodiments, the molding cavities and recesses can be located in various other positions along the mold roll 215 or pressure roll 220. In those embodiments, the loop material 140 can be introduced to the nip 235 along regions of the mold roll 215 and pressure roll 220 that include neither cavities nor recesses.

The loop material 140 can be any of various suitable materials including, for example, non-woven materials and knit materials, such as VELCRO BRAND loops 3610 and 3905. Alternatively, any suitable loop material capable of engaging the hooks or other forms of fastener elements can be used. The pressure within the hip 235 can be adjusted to laminate the loop material 140 to the resin base 115. In other embodiments the loop material 140 can be attached to the base 115 using other suitable methods including, for example, adhesively attaching the loop material 140 to the resin base 115. Other details of controlling lamination of loop material to resin in the nip can be found in U.S. Pat. No. 6,202,260, the entire contents of which are incorporated by reference herein.

In some embodiments, no extra loop material is introduced into the nip 135. For example, in certain cases in which the base 115 includes multiple lanes of resin, the backing material 112 can function as the loop material. For example, the backing material 112 can be exposed between the lanes of resin, which assuming the backing material 112 is an engageable material, allows the fastener elements 130 to engage with the backing material when the strap 105 is folded upon itself. In other cases, as noted above, the strap can include self-engaging fasteners. No loop material is required in such cases.

The stripping roll 225 is configured to rotate in a manner that strips the resin fastener projections 130 and head elements 110 from the molding cavities 252 and molding recesses 250, respectively. At the same time, the stripping roll 225 strips the resin base 115 from the peripheral surface of the mold roll 215. By doing this, the stripping roll 225 exposes the continuous fastener product sheet 240. The rotation of the stripping roll 225 also helps to convey the continuous fastener product sheet 240 toward the separating device 245.

Figure 5:
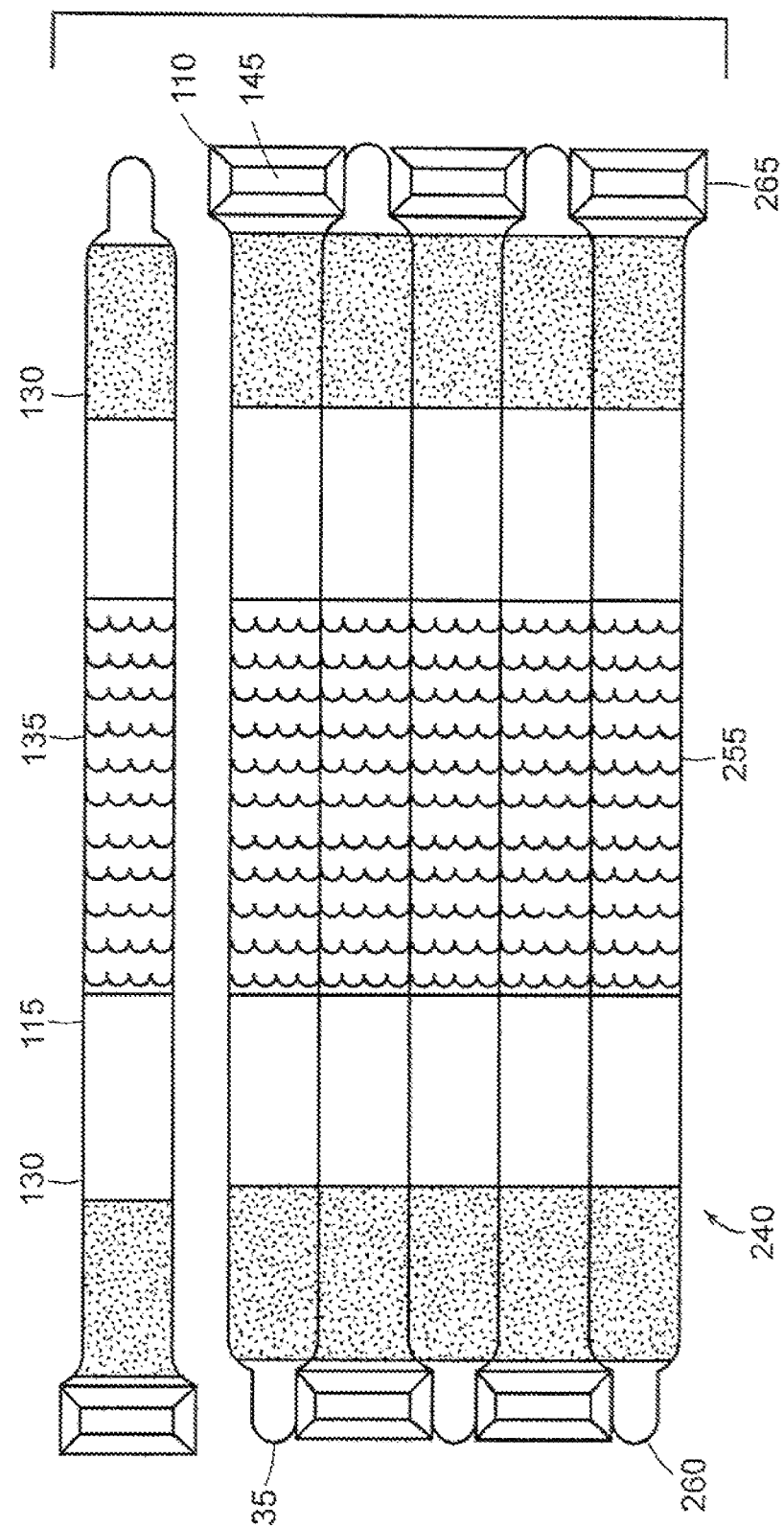
FIG. 5 is a plan view of a fastener product sheet and an; individual product separated, from that sheet.

Referring to FIG. 5, the continuous fastener product sheet 240 includes a central portion 255 and two end portions 260, 265. The lane of loop material 140 extends longitudinally along the central portion 255. Similarly, the two lanes of fastener projections 130 extend longitudinally along the sheet nearer the end portions 260, 265. The lanes of loop material 140 and fastener projections 130 extend substantially parallel to one another. The end portions 260, 265 each include multiple, longitudinally spaced structures or head elements 110 defining holes or apertures 245. Each of the head elements 110 is longitudinally separated by the free ends 155 of the straps. Although the sheet 240 is a unitary sheet of material, transverse lines have been included in order to demarcate the regions where the separating device 245 (shown in FIG. 2) separates the sheet 240 to form multiple, discrete fastener products 100 (shown in FIG. 1).

Figure 6:
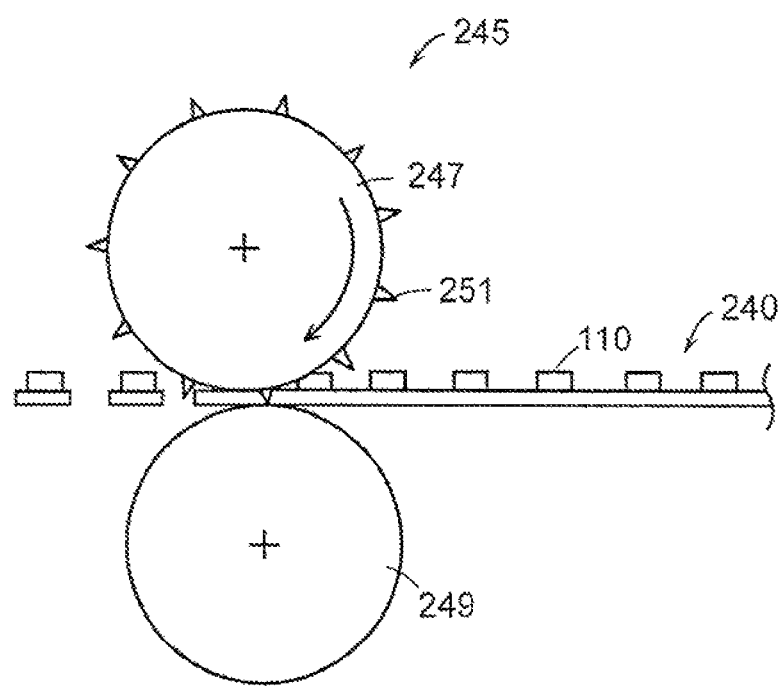
FIG. 6 is a sectional view of a separating device.

Referring to FIG. 6, the separating device 245 includes a cutting roll 247 positioned adjacent a support, roll 249. The cutting roll 247 includes multiple cutting projections 251 extending from its peripheral surface. As the fastener product sheet 240 is conveyed between the cutting roll 247 and the support roll 249, the cutting projections 251 puncture or perforate the sheet 240 along predetermined boundaries to separate the fastener product sheet 240 into multiple, discrete fastener products. The cutting roll can also be provided with blades positioned to remove any resin flash extending into or covering the apertures through the head elements if needed. The support roll 249 provides a support surface for the sheet 240 as the projections 251 are pressed into the sheet 240. The support roll 249 can also be configured to help convey the sheet 240. In some embodiments, the cutting roll 247 can be positioned adjacent the stripping roll such that the stripping roll acts as the support roll 249.

Various suitable means can be used to adapt the cutting roll 247 to perforate the sheet 240 along the predetermined boundaries. For example, the cutting roll 247 can include multiple recesses that mate with the head elements 110 of the fastener product sheet 240. The roll 247 can be configured such that it includes no independent means of rotation. Therefore, the roll 247 relies on the conveyed sheet 240 to cause it to rotate as the conveyed head elements 110 enter the recesses of the roll 247. The projections 251 can be separated along the peripheral surface of the roll by a distance equal to the desired width of the discrete fastener products. Thus, as the cutting roll 247 rotates, it divides the sheet 240 into multiple discrete fastener products having the desired width. Other means for adapting the cutting roll 247 to cut the fastener product sheet along predetermined regions are also contemplated.

Alternatively, the mold roll can be configured to mold alignment features along an outer edge or edges of the fastener sheet. The alignment features can be arranged to mate with apertures or recesses in the cutting roll 247 to both convey and align the sheet relative to the cutting roll. Because the alignment features are not desired features of the molded fastener products, they can be removed from the sheet after or while the sheet is conveyed through the cutting roll. For example, the sheet can be conveyed through a cutting device, such as a knife, that cuts off the edge or edges of the sheet. For more detail regarding this process, the reader is referred to U.S. Pat. No. 6,280,670, the entire contents of which are incorporated by reference herein.

Various other suitable separating devices can be used. For example, the separating device can include one or more knives. The knives of the separating device can intermittently cut through the sheet as the sheet is conveyed through the separating device, to produce discrete fastener products. The rate at which the knives cut is dependent upon the desired width (or length) of the discrete fastener products and the rate at which the sheet is conveyed. As another alternative, the sheet can be conveyed through a punch press device. The punch press device can be adapted to cut one or more products in a single pressing action. As with the knives discussed above, the rate at which the punch press is activated is dependent upon desired size of the discrete fastener products and the rate of speed at which the sheet is conveyed.

After being perforated, the sheet 240 can be spooled onto a roll for shipping or storage, for example. The perforated sheet can easily be separated by hand, for example, into multiple discrete fastener products. Alternatively, the cutting roll 247 can be configured to cut through the entire sheet 240 to simultaneously produce the discrete fastener products. For example, the cutting projections 251 can be configured to extend across the entire width of the fastener sheet 240.

Figure 5A:
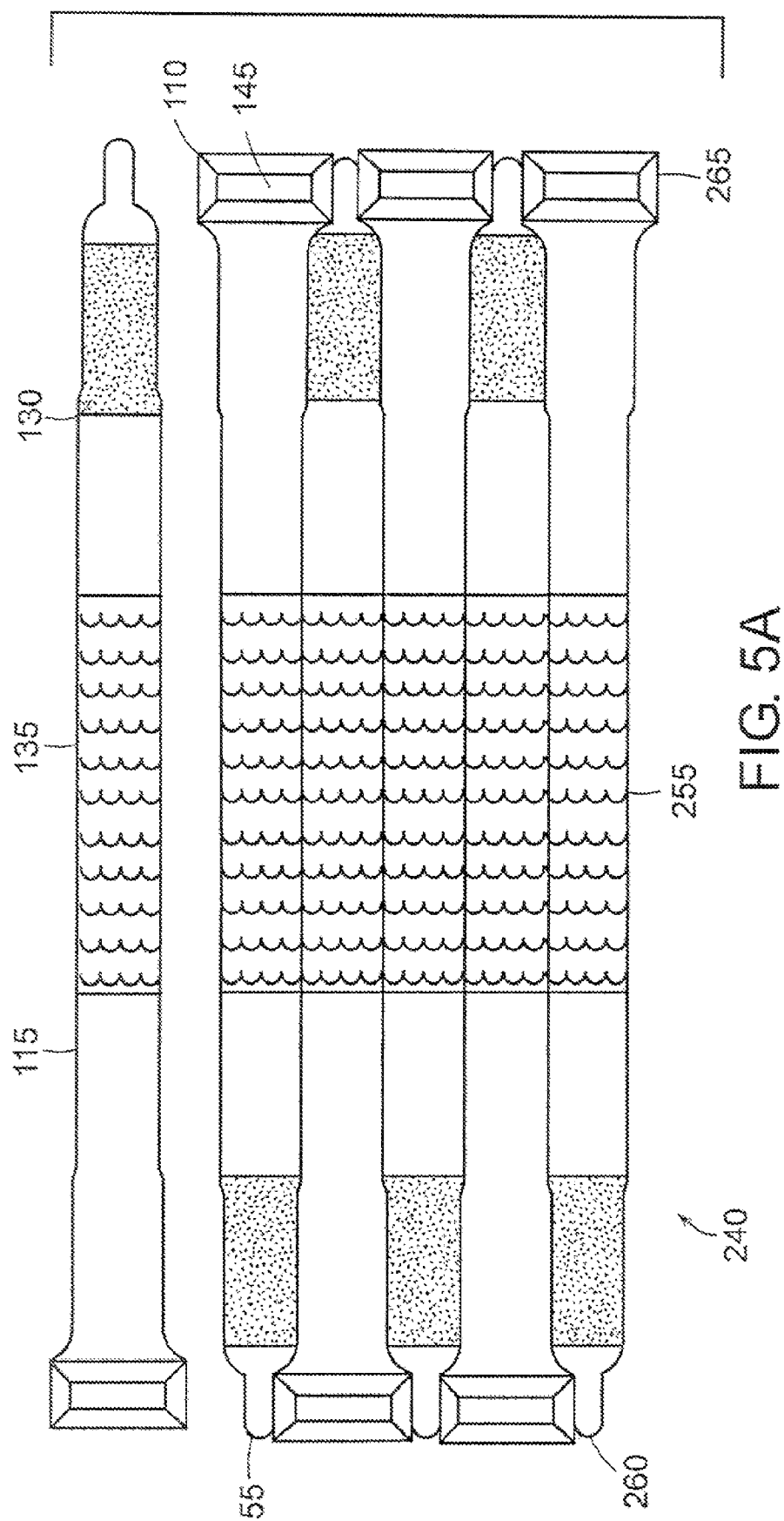
FIG. 5A is a plan view of another fastener product sheet and an individual product separated from that sheet.

As noted above, the cavities can be arranged along the mold roll such that cavity regions of the mold roll are separated by flat regions of the mold roll. As a result, a fastener product sheet having projection regions separated by flat base regions can be produced. Asian alternative, a sheet having continuous regions or lanes of projections, such as the sheet shown in FIG. 5, can be conveyed through a smoothing apparatus that heats and flattens specific areas of the projection regions to produce flat base regions. As a result of either technique, a fastener sheet can be produced to have multiple, discrete fastener products aligned in discrete regions, separated by a relatively flat base. Referring to FIG. 5A, for example, the discrete fastener products can be created to include projections 130 near their free ends 55, but not near their head elements 110.

Figure 7:
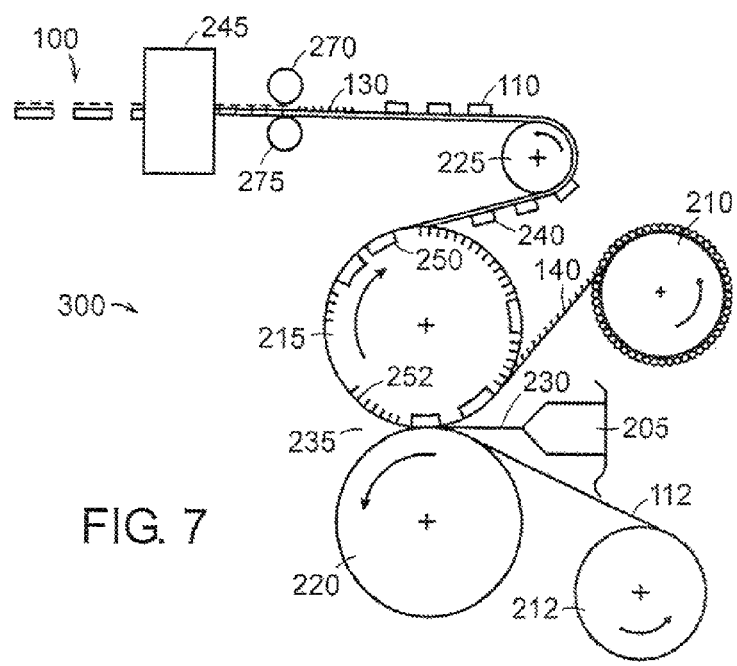
FIGS. 7 and 8 illustrate alternative methods and apparatuses for producing the fastener product of FIG. 1.

FIG. 7 illustrates an alternative method and apparatus 300 for forming fastener products. The method and apparatus 300 is similar to the method and apparatus described above with respect to FIG. 2. However, rather than including hook-shaped cavities, the mold roll 215 includes stem-shaped cavities 252. Therefore, the fastener product sheet 240 is formed to include straight stem-shaped projections 130 that do not, as molded, overhang the product sheet for loop engagement. The apparatus also includes a pair of forming rolls 270, 275. The fastener sheet is conveyed between the forming rolls 270, 275 causing the rolls 270, 275 to deform the stem-shaped projections 130 to form mushroom-shaped projections. The stems 130 can also be heated prior to being conveyed between the forming rolls 270, 275 in order to facilitate the forming process. The resulting fastener product sheet 240 and the resulting discrete fastener products 100 include mushroom-shaped fastener elements.

Figure 8:
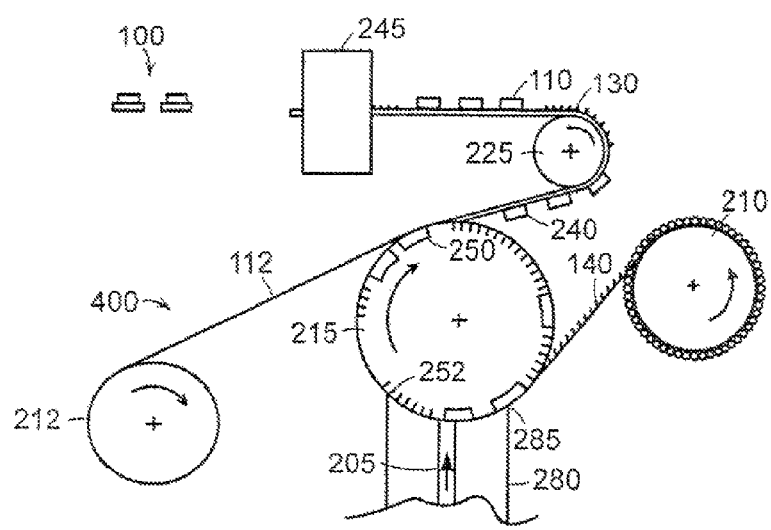

FIG. 8 illustrates another method and apparatus 800 capable of producing fastener products similar to the product shown in FIG. 1. The method and apparatus 800 is similar to the method and apparatus shown in FIG. 2. The extruder 205, however, includes an arcuate housing 280 positioned adjacent the mold roll 215 to define a gap 285 between the housing 280 and the peripheral surface of the mold roll 215. The extruder 205 extrudes resin into the gap 285. Due to the configuration of the extruder housing 280 relative to the mold roll 215, a large amount of pressure is developed within, the gap 285. Due to the pressure within the gap 285, the resin is pressed into the molding cavities 252 and molding recesses 250 of the mold roll to form fastener projections 130 and head elements 110, respectively. In this embodiment, the backing material 112 is introduced to the resin on the mold roll 215 at a point beyond the gap 285, but where the resin is still soft enough for lamination. In other embodiments, the backing material can be introduced to the gap 285 along with the resin. In such a case, it is preferred that the backing material 112 be a porous material such that the resin is allowed to pass through the backing material 112 and into the cavities 252 and recesses 250 of the mold roll 215. The loop material 140 is introduced to the gap 285 in a region where the mold roll contains no recesses 250 or cavities 252. The resulting fastener product is substantially identical to the fastener product shown in FIG. 5.

Figure 28:
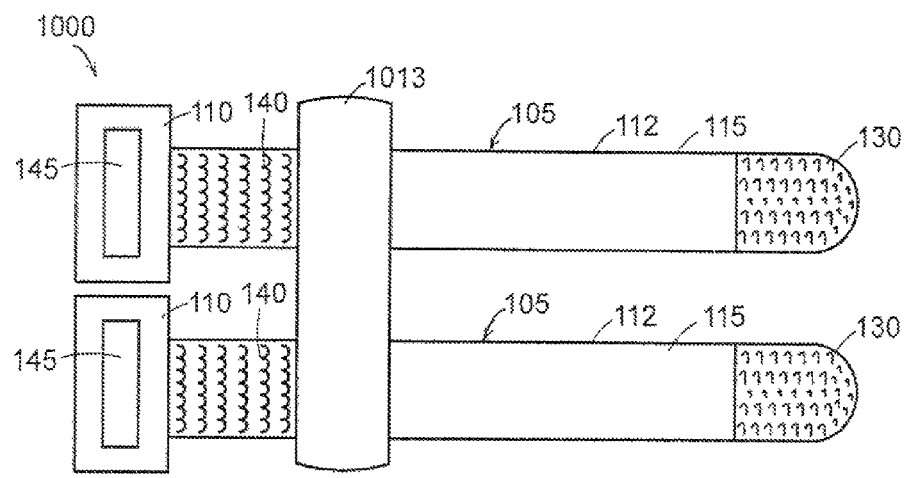
FIG. 28 is a top view of a splint device.

Referring to FIG. 28, a splint device 1000, which can be produced using methods and apparatus similar to those described above, includes straps 105, head elements 110, a backing material 112, and a support member 1013. During use, the support member 1013 can be positioned along a user's finger or toe to provide support, for example. While in this position, the straps 105 can be looped through the apertures defined by the head elements 110, and the hooks 130 can engage the loop material 140 in order to securely fasten the straps 105 around the user's finger or toe. This configuration helps to prevent the user's finger or toe from bending substantially.

The straps 105, the head elements 110, and the backing material 112 accord with the various embodiments discussed above. In the embodiment shown, each of the straps 105 includes a continuous resin base 115 that covers substantially the entire surface of the backing material 112. However, as discussed above, the straps can comprise discrete lanes of the resin base interconnected by the continuous backing material. Similarly, the straps 105 can be formed without the backing material.

In the embodiment shown, each of the straps includes a region of loop material 140. However, in other embodiments, the straps 105 can be formed without the loop material. The backing material 112 can, for example, be configured to engage the hooks 130. Similarly, rather than including a region of loop material and a region of hooks, the straps 105 can include two regions of self-engageable fastener elements.

The support member 1013 can be a substantially rigid member approximately sized to fit the finger or toe of the user. In the shown embodiment the support member 1013 is a band of resin extending across the straps 105. The support member 1013 has a longitudinal extent (i.e., an extent in the transverse direction of the straps) that is greater than its lateral extent (i.e., its extend in the longitudinal direction of the straps). The support member 1013 can have stiffness sufficient to substantially prevent the user's finger or toe from bending when the splint 1000 is properly applied to the finger or toe. For example, the support member 1013 can have a stiffness of at least about 15 lb/in. (e.g., at least about 50 lb/in., at least about 100 lb/in., at least about 500 lb/in.), as measured using a three-point bending test with supports spaced about one inch apart. In some embodiments, the support member 1013 is formed of a thermoplastic material or composition that has a Modulus of Elasticity of about 200,000 psi or greater (e.g., about 300,000 psi or greater, about 400,000 psi or greater about 500,000 psi or greater).

The dimensions of the support member 1013 depend, in part, on the material used to construct the support member 103. The thickness of the support member 1013, for example, can decrease as the rigidity or stiffness of the material used to form the support member 1013 increases. The support member 1013 can have a thickness of between about 0.050 in. (0.127 cm) and about 0.200 in. (0.508 cm). The width of the support member 1013 can range from about 0.15 in. (0.381 cm) to about 0.75 in. (1.905 cm).

In some embodiments, the head element 110, the base 115, and the support member 1013 are formed from the same thermoplastic material. Suitable thermoplastic materials include, for example, polypropylene, polyethylene, and polyamides. Other suitable thermoplastic materials can also be used. In other embodiments, the head element 110, the base 115, and the support member 1013 can be formed from different thermoplastic materials.

The backing material 112 is attached to an, underside of the straps, 105 and the support member 103. The backing material 112 can be a material that is softer than the support member 1013 and/or the strap 105, such as foam or cloth. As a result, the backing material 112 can provide the user with greater comfort. Various other materials can similarly be applied to the support member 1013 to achieve various different purposes. Furthermore, in some cases, the splint device 1000 includes no backing material.

Figure 29:
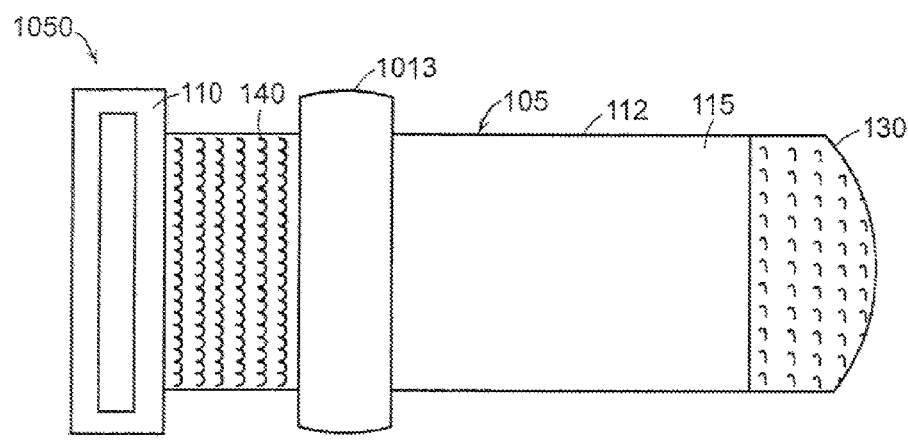
FIG. 29 is a top view of another splint device.

The splint device can include more or less than two straps and head elements. For example, as shown in FIG. 29, a splint device 1050 includes only one strap 105 and one bead element 110. The splint device 1050 can be similar to the splint device 1000 in all other respects.

Figure 30:
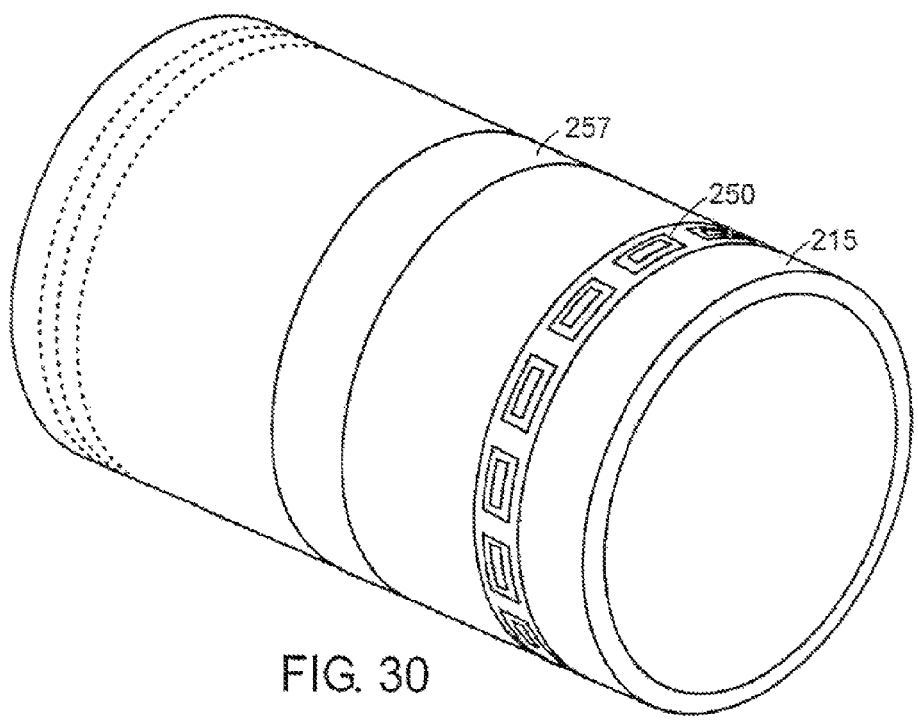
FIG. 30 is a perspective view of a molding device used to create the splint device of FIG. 28.

FIG. 30 shows the mold roll 215 that can be used with any of the various processes described above to create the splint devices 1000,1050. The mold roll 215 includes a molding recess 257 in addition to the molding recess, 250 and the molding cavities 252. The molding recess 257 receives resin to mold the support member 1013 (shown in FIGS. 28 and 29). In the embodiment shown, the molding cavity 257 extends continuously along the circumference of the mold roll 215 in a central region of the mold roll 215. However, the molding cavity 257 can be located at different regions of the mold roll 215, depending on the desired location of the support member 1013 along the strap 105 (shown in FIGS. 28 and 29). Similarly, the molding cavity 257 can be circumferentially discontinuous to, form discontinuous support members 1013. In other embodiments, as described above, the molding recess 250, the molding recess 257, and/or the molding cavities 252 can alternatively or additionally be included in the pressure device, as discussed above.

Figure 31:
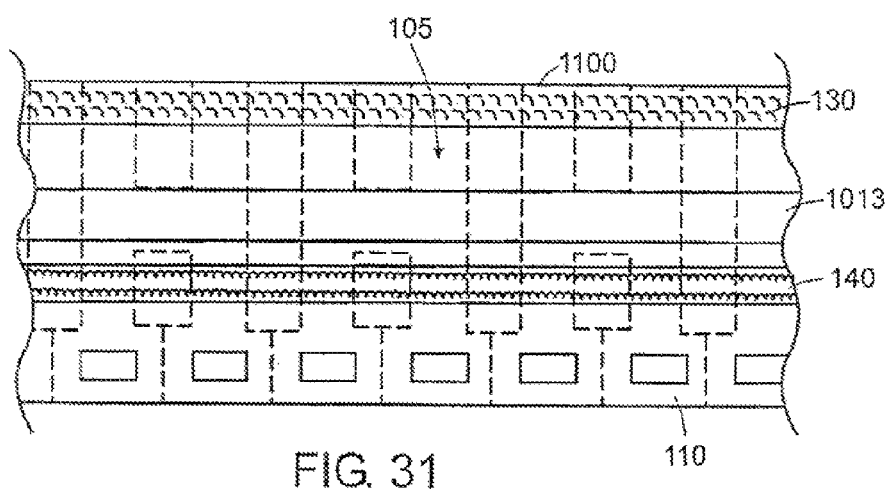
FIG. 31 is a top view of a fastener product sheet that can be separated to produce a plurality of the splint devices of FIG. 28.

As shown in FIG. 31, the molding processes noted above can produce a fastener product sheet 1100. Using any of the various suitable methods described above, the fastener product sheet 1100, for example, can be separated into multiple splint devices. In particular, the fastener product sheet 1100 can be separated along the dotted lines to create multiple splint devices like the one shown in FIG. 28. The fastener product sheet 1100 can alternatively or additionally be cut to create splint devices like the one shown in FIG. 29. Upon being separated, the separated or removed portions of the fastener product sheet 1100 that are not included in the splint device can be discarded.

Figure 32:
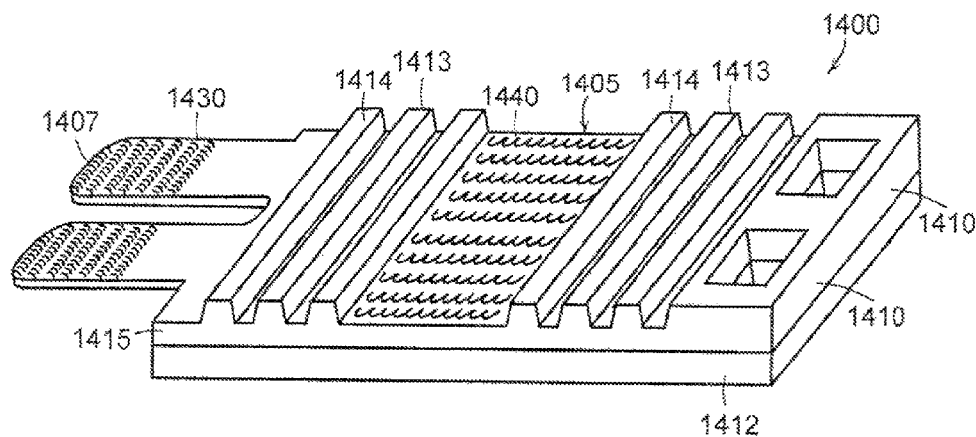
FIG. 32 is a perspective view of another splint device.

Referring to FIG. 32, a splint device 1400 includes a strap 1405, head elements 1410, a backing material 1412, and support members 1413. The strap 1405 call be wrapped around a user's finger or toe, for example, and narrower portions 1407 of the strap 1405 can be looped through the apertures defined by the head elements 1410. The portions 1407 of the strap 1405 can then be secured to engageable regions of the strap by hook and loop elements, for example. This configuration helps prevent the user's finger or toe from bending substantially.

The strap 1405, can be similar to the straps discussed above. In this embodiment, the strap 1405 includes a continuous resin base 1415. The head elements 1410, the support members 1413, and projections or hooks 1430 extend integrally from the base 1415. A loop material 1440 is attached to the base 1415. In other embodiments, the strap 1405 can include discrete regions of resin that are interconnected by the backing material 1412. In those embodiments, the head elements, the support members, and the hooks, for example, can extend from the discrete resin regions.

As noted above, the strap 1405 includes two narrow portions 1407 at the end opposite the head elements 1410. The narrow portions, 1407 are sized to fit within the apertures, 1445 defined by the head elements 1410 to allow the narrow portions 1407 of the strap 1405 to be looped through the head elements 1410 and secured to an engageable region of the strap. For example, the hooks 1430 can engage the loops of the loop material 1440 to secure the straps around the user's finger or toe, as noted above.

The support members 1413 are bands of resin extending across the strap 1405. The support members 1413 include ribs 1414 that extend transversely across the strap. The ribs 1414 help to provide the splint 1400 with flexibility while maintaining a sufficient amount of rigidity to prevent the user's finger or toe from bending substantially. In other embodiments, the support members 1413 can merely include a relatively flat region of raised material. In certain embodiments, the support members have a stiffness of at least about 15 lb/in. (e.g., at least about 50 lb/in., at least about 100 lb/in., at least about 500 lb/in.), as measured using a three-point bending test with supports spaced about one inch apart. Similarly, the splint can include more or less than two support members in other embodiments.

The backing material 1412 is attached to a surface of the strap 1405. In this embodiment, the backing material 1412 is a foam material that, during use, provides the user with added comfort. However, the backing material 1412 can be any of various suitable materials. For example, the backing material can be rubber, cloth, metal, or any of various other materials.

Figure 33:
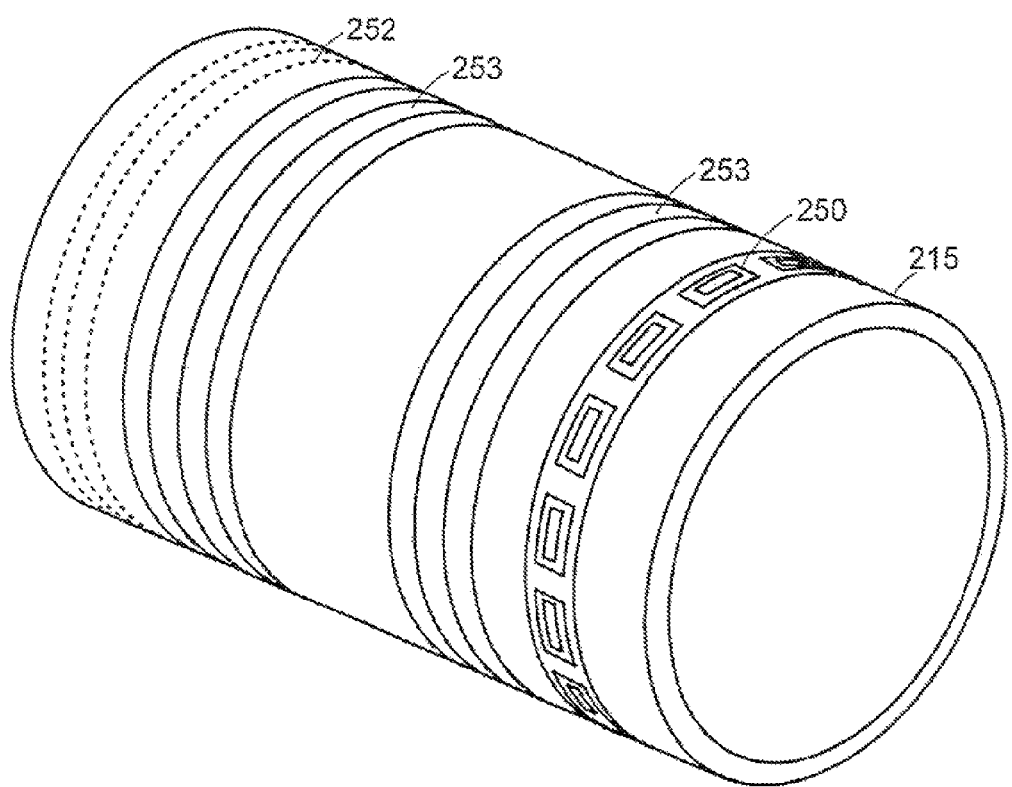
FIG. 33 is a perspective view of a molding device used to create the splint device of FIG. 32.

FIG. 33 shows a mold roll 215 that can be used to form the various features of the splint 1400 using any of the various techniques described above. As shown, the mold roll 215 includes molding recesses 253 that extend circumferentially around the mold roll 215. The molding recesses 253, for example, can be grooves extending inwardly from the peripheral surface of the mold roll 215. In some embodiments; the groove extends in a continuous fashion around the mold roll 215. The molding recesses 253 can mold the support members 1413 of the splint 1400 (shown in FIG. 32). In some embodiments, the molding recesses can extend transversely across the mold roll 215. In certain embodiments the molding recesses 253 and/or any of the other mold roll features can alternatively or additionally be included in the pressure device.

Figure 34:
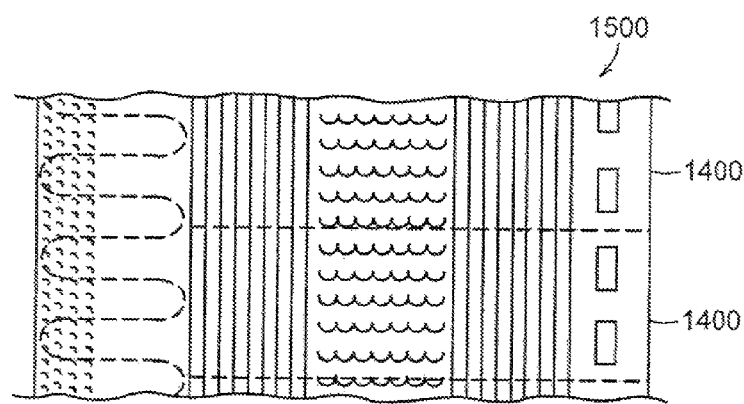
FIG. 34 is a partial top view of a fastener product sheet that can be separated to produce a plurality of the splint devices of FIG. 32.

Referring to FIG. 34, the methods described above can be used to form a fastener product sheet 1500. The fastener product sheet 1500 can be separated along the dotted lines provided using any of the various techniques described above to create multiple splint devices like the one shown in FIG. 32. The fastener product sheet 1500 can similarly be separated to form other types of splint devices. For example, the fastener product sheet 1500 can be separated to form splint devices having one or more straps and one or more head elements. In the embodiment shown, only the regions 1502 at the left side of the fastener product sheet are removed to form the narrow strap portions.

Figure 35:
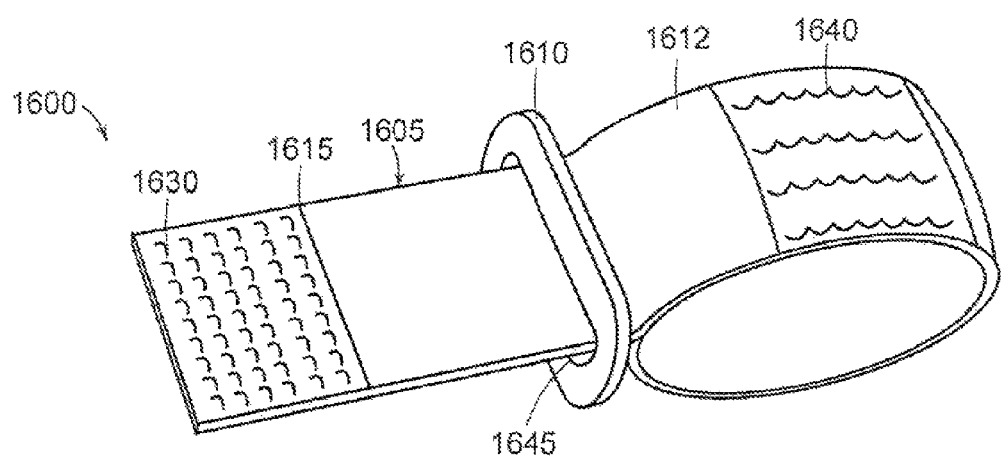
FIG. 35 is a perspective view of another splint device.

As shown in FIG. 35, another splint device 1600 includes a strap 1605 and a head element 1610. The splint device 1600 is similar to the strap shown in FIG. 1 and can be constructed using any of the various tools and techniques described above. As shown, the strap 1605 can be looped through an aperture 1645 of the head element 1610. The strap can then be folded upon itself and secured in a looped position. This configuration can help, to stabilize an injured finger or toe, as discussed below.

The strap 1605 includes a support or backing material 1612, projections or hooks 1630, and a loop material 1640. The backing material 1612, in this embodiment, is a stretchable cloth material. However, any of the materials described above can be used.

In this embodiment, the hooks 1630 integrally extend from a discrete resin region 1615 that is permanently affixed to the backing material 1612. The hooks 1640 can be created using any of the techniques described above. The loop material 1640, in this embodiment, is permanently attached to the backing material 1612 in a desired region. The loop material 1640 can be attached to the backing material 1612 using any of the methods described above, such as bonding and/or adhesive.

In some embodiments, a continuous resin base can be attached to the backing material 1612. In those embodiments, the hooks 1630 and the loop material 1640 can, for example, be fixed to the backing material 1612 via the resin base.

The head element 1610 can be formed using any of the various methods described above.

During use, the user inserts the strap 1605 through the aperture 1645 of the head element 1610 to create a loop, as shown in FIG. 35. An injured and an uninjured finger or toe are inserted into the loop. The strap is then pulled tightly and folded upon itself such that the hooks 1630 engage with the loops of the loop material 1640 to secure the strap in the looped configuration. The strap 1605, which is securely fastened about the user's fingers or toes helps to stabilize the user's injured finger or toe by, for example, preventing it from bending substantially. The user can alternatively secure only the injured finger or toe with the splint device 1600.

In some embodiments, the splint device 1600 need not include a head element. For example, one end of the strap can be permanently attached to a more central region of the strap to form a loop. Much like the splint device shown in FIG. 35, the user's fingers or toes can be inserted through the preformed loop, and then the strap can be tightly wrapped around the fingers or toes of the user and secured to itself by fastening elements, for example. In this configuration, the splint device can similarly provide support for the user's injured finger or toe.

Figure 9:
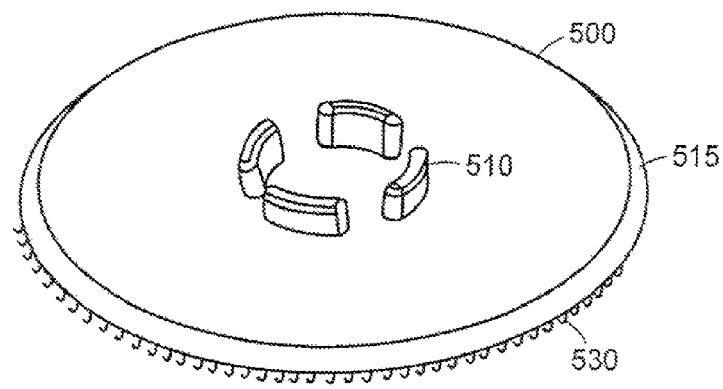
FIG. 9 is a perspective view of another fastener product.

Methods and apparatuses similar to those described above can also be used to produce other types of fastener products. Referring to FIG. 9, for example, a fastener product 500 includes a resin base 515 having an array of male fastener elements or hooks 530 extending from one surface of the base 515 and a snap feature 510 extending from the opposite surface of the base 515.

The snap feature 510 includes multiple arcuate ridges extending from the base 515. The ridges are arranged to fit snugly within the mounting hole of a media disc (e.g., a compact disc) to retain the disc to the product 500. In other embodiments, the snap feature 510 can be any of various suitable shapes and sizes. For example, the snap feature can include cylindrical pillars, resilient fingers, or similar engageable structures. As with the product 100 discussed above, the fastener elements 530 can be of any suitable shape capable of engaging another material. For example, they can be mushroom-shaped elements or flat-top-shaped elements.

During use, the user presses the side of the fastener product 500 that has fastener elements 530 against an upholstered surface, for example, such that the fastener product 500 becomes releasably fastened to the surface. The user then presses the disc against the fastener product 500 such that the mounting hole within the disc is aligned with the snap feature 510. The user can apply enough force so that the snap feature 510 extends through the aperture of the disc and retains the disc to the product 500. The result is that the CD is suspended from the upholstered surface (e.g., the upholstered ceiling of a vehicle). Accordingly, the driver and passengers are afforded easy access to the compact discs without cluttering the vehicle.

Fastener products similar to product 500 can be produced for other uses as well. Rather than fastening the fastener elements, of the product to a fixed surface, the snap feature can be snapped into a hole defined in a fixed object such that items can be releasably fastened to the product via the fastener elements. For example, a panel for an automotive interior or exterior can be molded using the process described above. The snap feature can be retainably fastened within a hole in the vehicle to secure the panel to the vehicle while exposing the fastener elements on its opposite side. Other materials (e.g., upholstery) can then be fastened to the fastener elements of the panel.

For further information regarding the product 500 and similar products, the reader is referred to pending U.S. Provisional Patent Application No. 60/496,6221 the entire contents of which are incorporated by reference herein.

As noted above, the fastener product 500 can be produced using methods and apparatuses similar to those discussed above with respect to FIGS. 2 and 7. However, because the fastener projections 530 and the snap feature 510 are formed on opposite surfaces of the base 515, one of the molding cavities and the molding recess are formed in the mold roll while the other is formed in the pressure roll.

Figure 10:
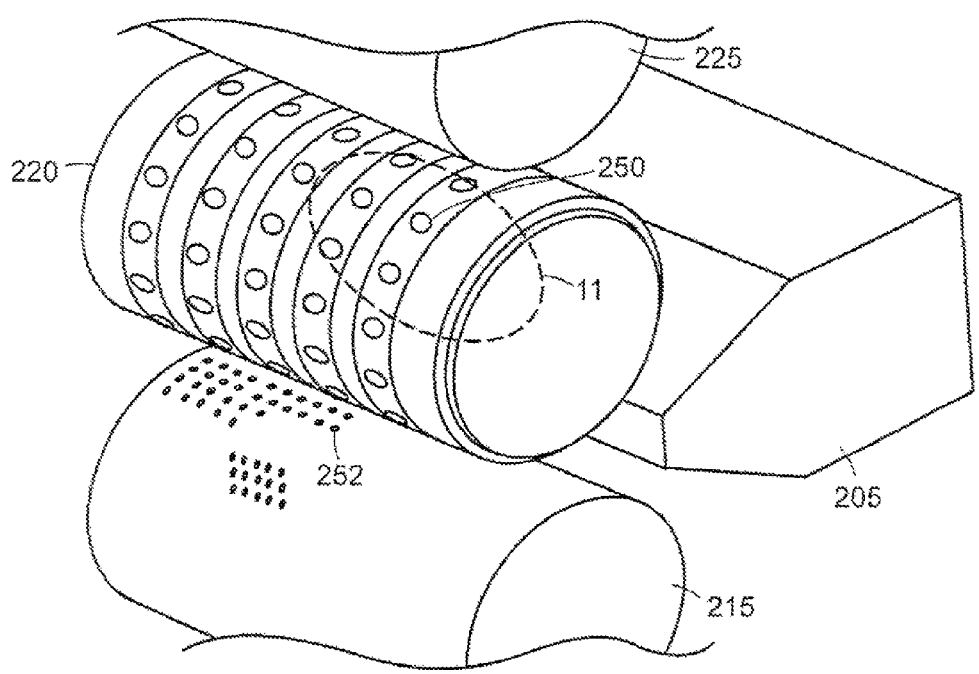
FIG. 10 is a perspective view of a molding nip for producing the fastener product of FIG. 7.
Figure 11:
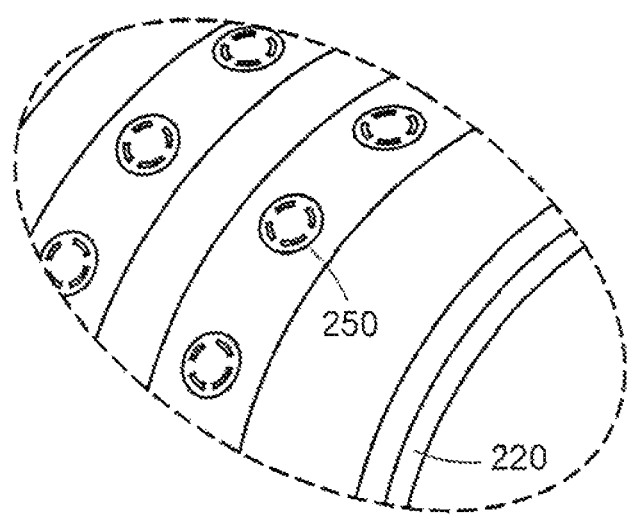
FIG. 11 is an enlarged view of area 11 of FIG. 10.

Referring to FIGS. 10 and 11, in order to form the fastener product 500, the molding recesses 250 are defined by the pressure roll 220 and the molding cavities 252 are defined by the mold roll 215. For illustrative purposes, the pressure roll 220, the mold roll 215, and the stripping roll 225 are separated from one another by greater distances than they would be during actual use. Alternatively, the mold roll can, define the molding cavities and the pressure roll can define the molding recesses. The molding recesses 250 are arcuate-shaped depressions arranged concentrically in groups of four. The size and spacing of the recesses 250 is dependent up on the intended purpose of the product. For example, if the product is intended to retain a compact disc, then the recesses 250 will be sized and shaped to fit the mounting hole of the disc. The cavities 252 can be of any suitable shape capable of forming fastener projections to engage an intended material. As discussed above, the cavities 252 are commonly hook-shaped, mushroom-shaped, or flat-top-shaped.

Referring to FIGS. 2 and 7, when the molten resin 230 is introduced into the pressure nip 235, the pressure forces some of the resin into the recesses 250 within the mold roll 215 to form the snap features 510 and some of the resin 230 is pressed into the cavities 252 within the pressure roll 220 to form the fastener elements 530. The remainder of the resin 230 is compressed between peripheral surfaces of the rolls 215, 220 to form the base 515 from which the snap feature 510 and the fastener elements 530 extend.

Figure 12:
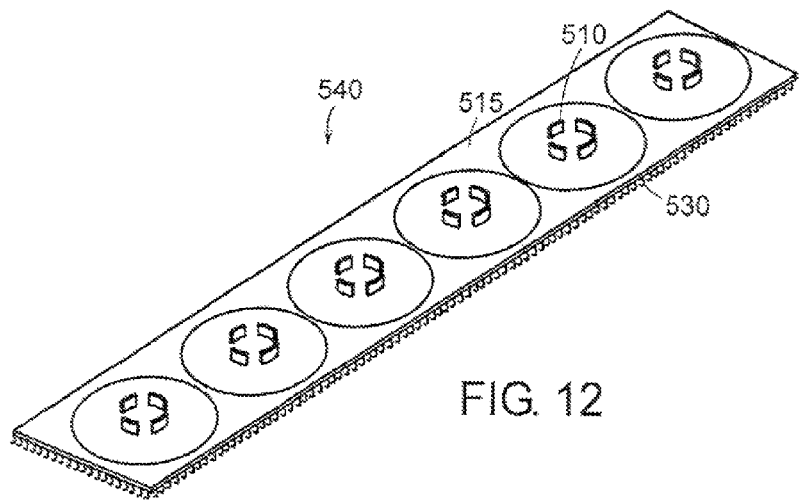
FIG. 12 is apportion of a fastener product sheet produced by the process shown in FIG. 10, die cut to define individual products as shown in FIG. 9.
Figure 13:
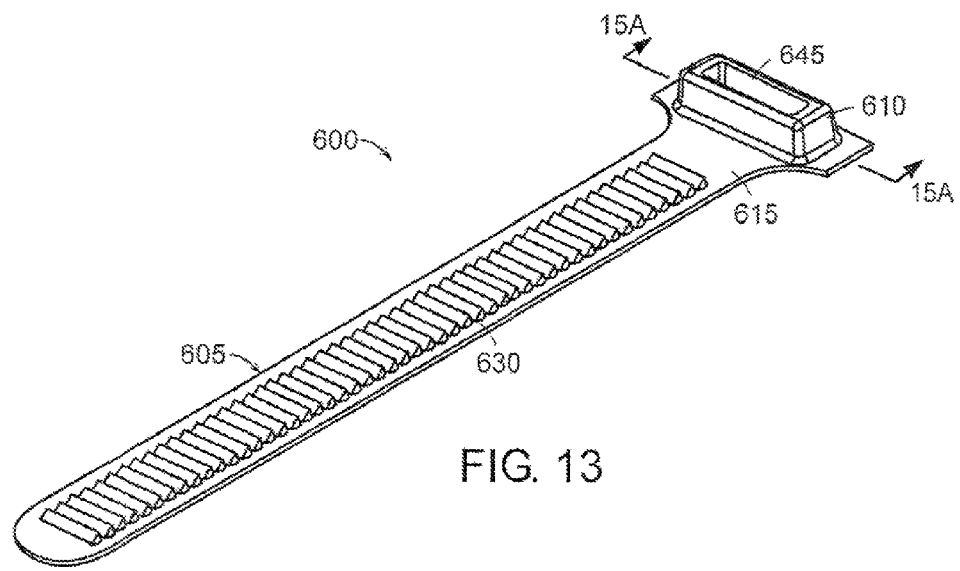
FIG. 13 is an alternative fastener product.

FIG. 12 shows a longitudinal section of a fastener product sheet 540 formed by the method and apparatus described above with respect to FIGS. 10 and 11. The continuous fastener product sheet 540 includes multiple, longitudinally separated snap features 510. The fastener product 540 sheet can be separated into multiple, discrete fastener products using any of the separating processes discussed above. In some embodiments, the fastener sheet 540 is die cut to form separable, circular regions 500 as indicated in FIG. 13. In other embodiments, the sheet 540 can be separated into regions having various other shapes. The sheet 540, die cut as shown, can be spooled for transport or even retail sale, the final consumer removing the products 500 as needed.

In use, the flexible base 515 of the product 500 of FIG. 9, as formed by the roll-forming method described above, displays sufficient, effective rigidity when secured to a rigid loop carrying surface, such as automotive headliners or cubicle walls, to allow removal and installation of media discs on the snap features 510.

Referring to FIG. 13, another fastener product 600 capable of being produced by the above-described methods includes a fastener strap 605 and a head element 610. The fastener strap 605 includes a base 615 from which multiple fastener projections 630 extend. The fastener strap 605 can have various different dimensions depending on its intended use. For example, the base 625 of the fastener strap 605 can have a thickness of between about 0.005 inch and 0.030 inch. The strap 605 can have a length of between about 3 inches and 36 inches. The width of the strap can range from about 0.25 inch and 1 inch. In some cases, it is beneficial to provide a relatively wide strap in order to broadly distribute the retaining load among the fastener product. Because the relatively wide strap broadly distributes the load, the fastener product is able to withstand more stress (e.g., sheer stress) than a similar product having a thinner strap. Similarly, the strength of the strap increases as the thickness of the strap increases.

Figure 15:
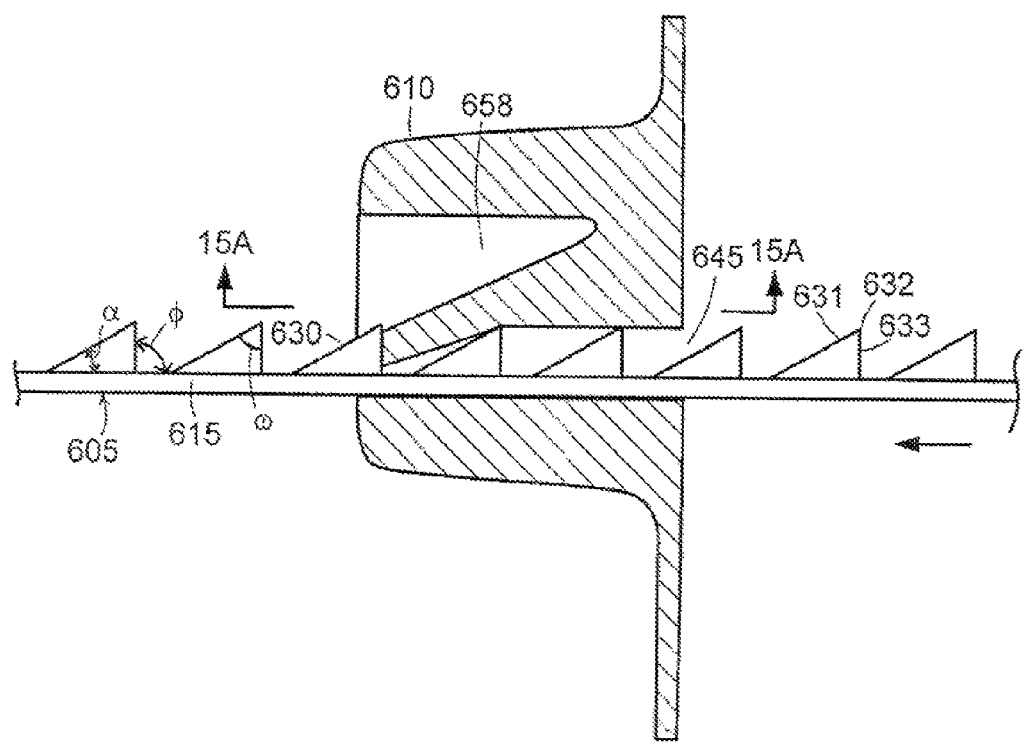
FIG. 15 is a partial cross-sectional view of the fastener product shown in FIG. 13 in a fastened position.

Referring to FIG. 15, the fastener projections 630 are in the shape of wedges. More particularly, a first surface 631 of the fastener projections 630 is substantially flat and inclined at an angle $\alpha$ of between about 10 degrees and 45 degrees relative to the planar base 615. A second surface 633 extends from the base 615 at a steeper angle of incline $\phi$ of between about 45 degrees and 90 degrees relative to the base 615. The second surface 633 joins the first surface 631 to form an apex 632. The apex can have an angle $\omega$ ranging from about 30 to 80 degrees. The projections 630 extend to a height of between about 0.01 inch and 0.05 inch above the base 615. The fastener projections 630 are arranged such that the second surfaces 633 all face in the same direction. In this case, the second sides 633 face toward the head element 610.

The dimensions discussed, above are merely used to describe particular embodiments. Straps and projections of other suitable shapes and sizes capable of providing the product with fastening ability can be used.

Figure 14:
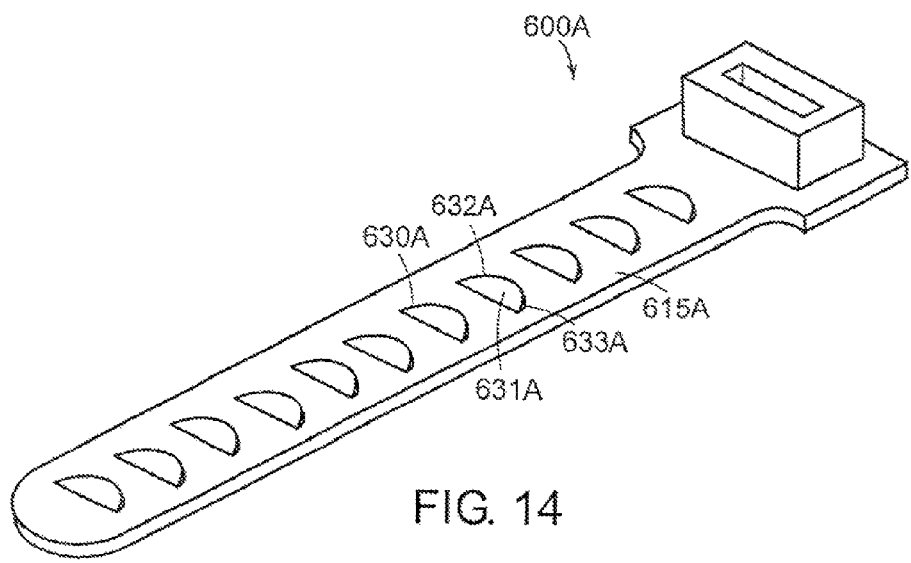
FIG. 14 is another fastener product having alternative fastener projections.

Fastener projections having other shapes can also be employed. Referring to FIG. 14, for example, a fastener product 600A includes an array of arcuate engageable elements 630A integrally molded with and extending outwardly from a base 615A. The engageable elements each include an engageable side 633A and a non-engageable side 631A. The engageable side is inclined relative to the base at between about 5 degrees and 45 degrees. The non-engageable side 631A is inclined relative to the base at a steeper angle. The sides 633A, 631A join to form an apex 632A. The engageable side 633A is defined by an upper edge and a lower edge where the engageable element intersects the base 615A. Both the upper and lower edges define curves (e.g., circular curves) such that the engageable side 633A has a curved shape. For more information regarding possible fastener projection shapes, the reader is referred to pending U.S. Patent Application Publication No. US 2005-0183248 A1, entitled "Shear Fasteners," the entire contents of which are incorporated by reference herein.

Referring to FIGS. 13 and 15, the head element 610 defines an aperture 645. When the fastener strap 605 is inserted through the aperture 645, the head element 610 cooperates with the fastener projections 630 to prevent the strap 605 from retreating back through the aperture 645. In other words, the head element 610 is configured such that it provides one-way movement of the strap 605 through the aperture 645.

The head element 610 includes a retaining arm 658 that extends into the aperture 645. When the strap 605 is pulled through the aperture 645 in the direction of the arrow, the first surfaces 631 of the wedge-shaped fastener projections 630 deflect the retaining arm 658 away from the projections 630 allowing the strap 605 to proceed through the head element 610. However, when the strap 605 is pulled in a direction opposite to that shown by the arrow, the second surface 633 of the projection 630 abuts and engages the retaining arm 658. This prevents the strap 605 from exiting the head element 610.

In particular embodiments, the head element 610 extends to a height of between about 0.1 inch (0.254 cm) and 0.4 inch (1.016 cm) above the base 615. Depending on the width of the strap 605, the width of the head can range from about 0.3 inch (0.762 cm) to 1.25 inch (3.175 cm). Head elements, of other shapes and sizes capable of receiving the strap in the aperture to allow the strap to enclose the product in a fastened position can be used.

Referring to FIG. 15A, the retaining arm 658 is integrally joined to the rest of the structure of the head element 610 only at its base, such that it is able to flex away from the projections 630 during fastening. This allows the projections 630 to deflect the arm 658 as the strap 605 is pulled through the hole 645, as discussed above. Other configurations can be employed to provide the aim 658 with flexibility. A gap 659 is provided between the arm 658 and the side of the head element 610. In some embodiments, the gap 659 can be used to align guide rails of the strap.

Referring to FIG. 15B, the retaining arm 658 can be configured to allow a user of the product 610 to release the arm 658 from engagement with the projection 630 to allow the strap 605 to be removed from the head element 610 after insertion. The retaining arm 658 includes an integral extension 657 that extends from the hole 645 beyond the head element 610. When the product 606 is in its engaged position, the user can direct the distal rim of the extension 657 away from the strap 605 in order to release the arm 658 from engagement with the projection 630. While doing this, the user can pull the strap 605 backthrough the hole 645 in the direction opposite the arrow. Once the strap 605 has been pulled completely through the hole 645, the product 600 once again takes the form shown in FIG. 13. The above-described configuration enables the user to reuse the fastener product 610 multiple times. Other arrangements are also contemplated for enabling the user to release the arm 658 from engagement with the projection 630.

Figure 13A:
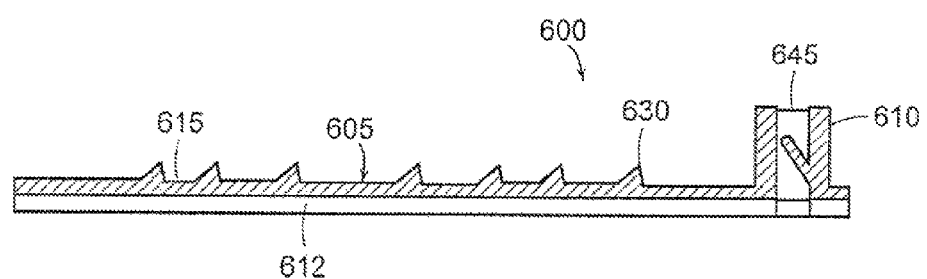
FIG. 13A is a cross-sectional view of a fastener product similar to the fastener product shown in FIG. 13, but having a backing material.

Referring to FIG. 13A, the fastener product 600 includes a backing material 612 attached to a bottom surface of the strap 605 opposite the surface from which the fastener projections 630 extend. The backing material can be one of various suitable materials including, for example, non-woven materials, knit materials, foam materials, and metallized film. Depending on the material from which the backing material 612 is composed, fit can provide various benefits, as discussed above.

Figure 16:
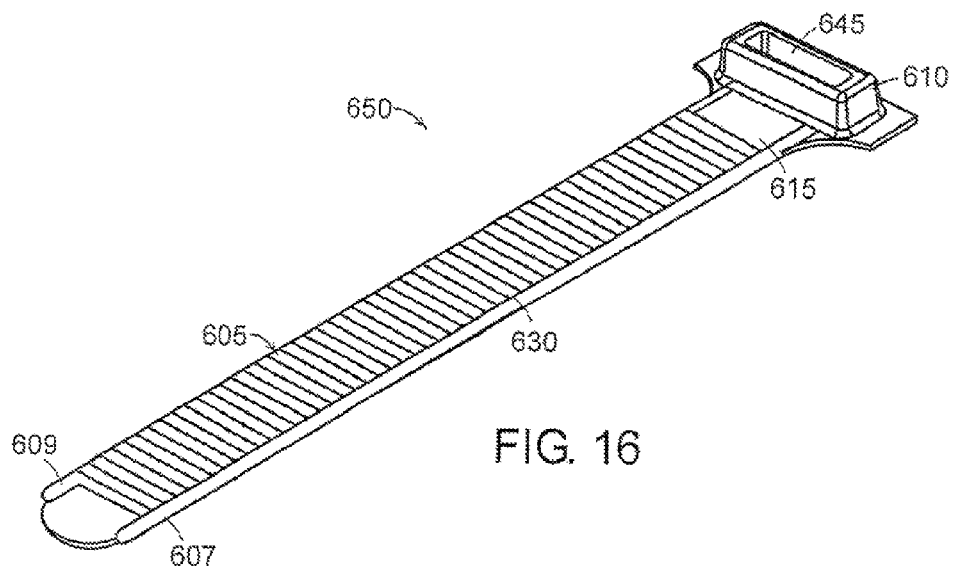
FIG. 16 is a perspective view of an alternative fastener product having guide rails.

FIG. 16 shows a fastener product 650 that is similar to the product 600 described above. The fastener product 650 includes guide rails 607, 609 extending from the strap 605 on each side of the fastener projections 630. The guide rails 607, 609 can be configured to correspond with gaps 659 (shown in FIG. 15A) defined within the head element 610 at either end of the arm 658 to properly align the strap 605 as it is pulled through the aperture 645 of the head element 610. The guide rails 607, 609 can also help to prevent the projections from engaging with unintended objects. The strap 605 could be accidentally pulled tighter than desired, for example, if exposed ends of the projections 630 were caught on an unintended object.

The fastener products shown in FIGS. 13, 14 and 16 can be utilized in many of the same ways as discussed above with respect to the fastener product shown in FIG. 1. For example, they can be used to retain articles (e.g., wires, tubes, or pipes) in a bundle. Similarly, they can be used to suspend an article or articles from a beam or other structure. In addition, the fastener products 600, 650 can be useful as a human restraint mechanism (e.g., handcuffs). They can be wrapped around the wrists or ankles of a person and tightly fastened to restrain the person.

Figure 17:
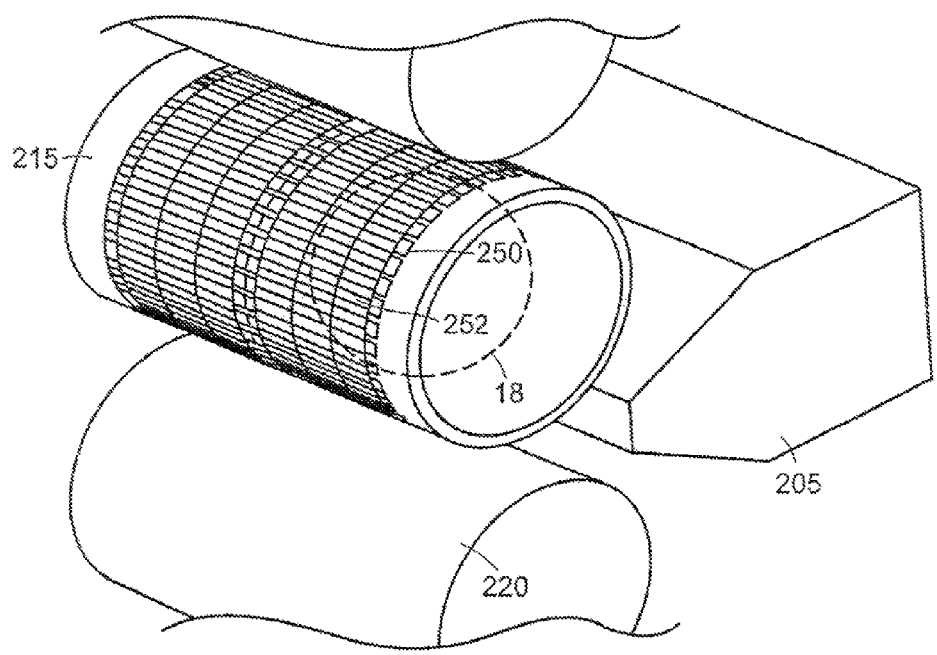
FIG. 17 is a view of a molding nip for producing the fastener product of FIG. 13.

Referring to FIG. 17 a method and apparatus similar to the methods and apparatuses illustrated in FIGS. 2, 7 and 8 can be used to produce the above-described fastener products shown in FIGS. 13, 14 and 16. In this embodiment, the mold roll 215 includes multiple lanes of molding cavities 252 arranged across its transverse direction. Each lane of molding cavities is circumferentially separated along the mold roll 215 such that the fastener product sheet molded in the process includes multiple, longitudinally separated lanes of fastener projections. In other embodiments, the mold roll can include a continuous array of molding cavities spanning the circumferential surface of the mold roll. The mold roll 215 also includes multiple, circumferentially spaced molding recesses 250. As a result, the fastener product sheet molded in the process includes multiple, longitudinally spaced apart head elements and/or holes defined by the head elements.

Figure 18:
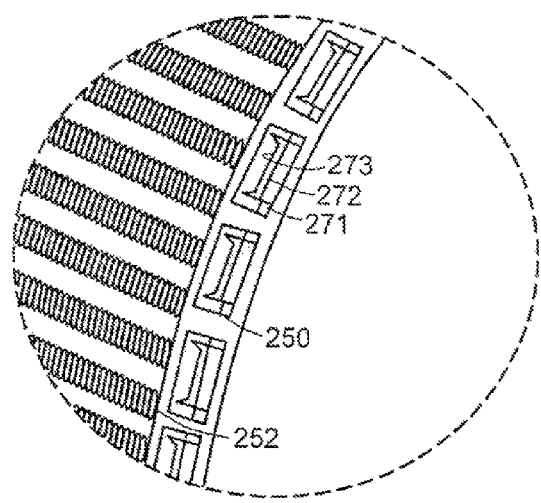
FIG. 18 is an enlarged view of area 18 of the mold roll of FIG. 17.

Referring to FIG. 18, the mold roll 215 includes wedge-shaped molding cavities 252 to mold wedge-shaped fastener projections. The cavities 252 include a first planar surface that extends inward from the peripheral surface of the mold roll 215 at a decline relative to the peripheral surface. The cavities 252 include a second surface that extends inward at a decline substantially steeper than the decline of the first surface. The first and second surfaces join together at their distal ends within the cavities 252. In some embodiments, the second surface is curved to form a projection having a curved wall.

The molding recesses 250 include an outer recessed portion 271 to form the head element and an inner unrecessed portion 272 to form the hole within the head element. The inner unrecessed portion 272 includes a recess 273 that extends inward at an angle relative to the side surfaces of the head elements for forming the restraining arm that extends from the head element.

In the embodiment discussed above, the molding cavities 252 and recesses 250 are each located in the mold roll 215. In alternative embodiments, the pressure roll 220 can define the molding recesses 250 and cavities 252. Similarly, the recesses 250 and cavities 252 can be located, in various combinations, in both the mold roll 215 and the pressure roll 220.

Figure 19:
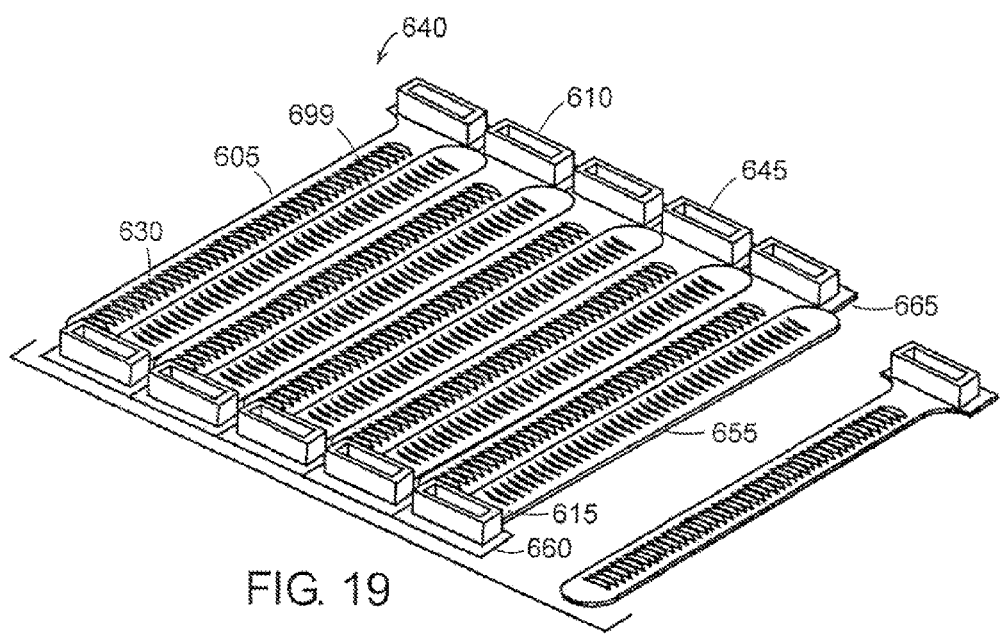
FIG. 19 is a perspective view of a fastener product sheet and a product that has been separated from that sheet.
Figure 20:
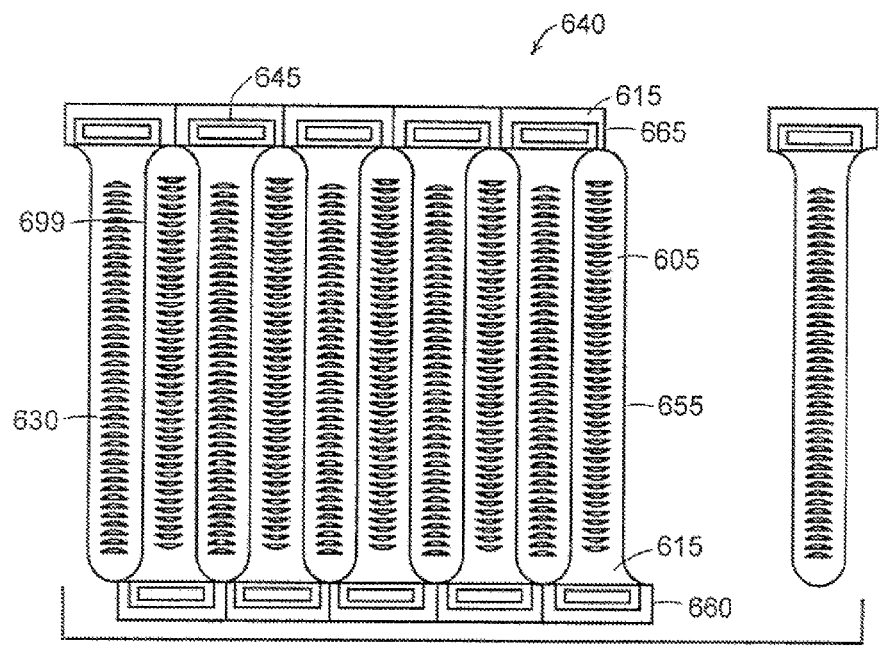
FIG. 20 is a plan view of the fastener product sheet of FIG. 19.

Referring to FIGS. 19 and 20, a fastener product sheet 640 formed using the method and apparatus shown in FIG. 17 includes a central region 655 and two end regions 660, 665. The central region 655 includes a base 615 from which multiple horizontal lanes of fastener projections 630 extend. The edge regions 660, 665 include longitudinally spaced head elements 610 that define longitudinally spaced holes or apertures 645. The fastener product sheet 640 can be separated along predetermined frangible boundaries 699 (e.g., perforated regions) to create multiple, discrete fastener products similar to the fastener products 600, 650 shown in FIGS. 14 and 16. Any of the separating methods discussed above can be used to create the discrete fastener products.

Figure 21:
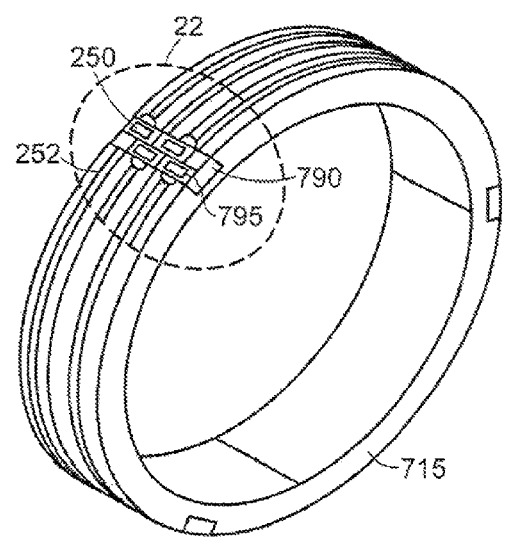
FIG. 21 is a perspective view of an alternative mold roll used to make the fastener product shown in FIG. 13.
Figure 22:
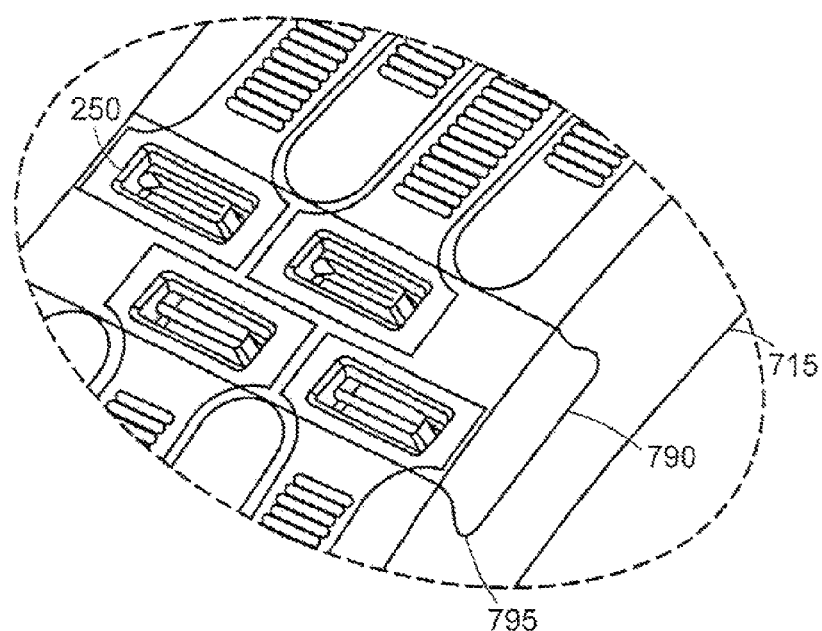
FIG. 22 is an enlarged view of area 22 of the mold roll of FIG. 21.

FIGS. 21 and 22 illustrate an alternative mold roll 715 that can be used with any of the above-described methods to mold the discrete fastener products described above with respect to FIGS. 13, 14, and 16. The mold roll 715 includes multiple lanes of molding cavities 252 extending along its circumferential surface, a slot 795 that longitudinally separates the lanes of fastener projections 252, and an insert 790 retained within the slot 795. The molding cavities 252 are arranged in multiple lanes along the circumference of the mold roll, rather than the transverse direction of the mold roll as shown in FIGS. 17 and 18. Other than their orientation along the peripheral surface of the mold roll 715, the cavities 252 are identical to those described above with respect to FIGS. 17 and 18.

The insert 790 defines multiple molding recesses 250. Various suitable methods of retaining the insert 790 within the slot 795 can be employed. For example, the insert 7901 can be press fitted within the slot 795.

The molding recesses 250 are arranged in the insert 790 such that the width of the molding recesses 250 extends across the transverse direction of the mold roll 215, rather than the circumferential direction as shown in FIGS. 17 and 18, when the insert 790 is secured within the slot 795. Other than their orientation along the peripheral surface of the mold roll 715, the recesses 250 are identical to those shown in FIGS. 17 and 18.

Figure 26:
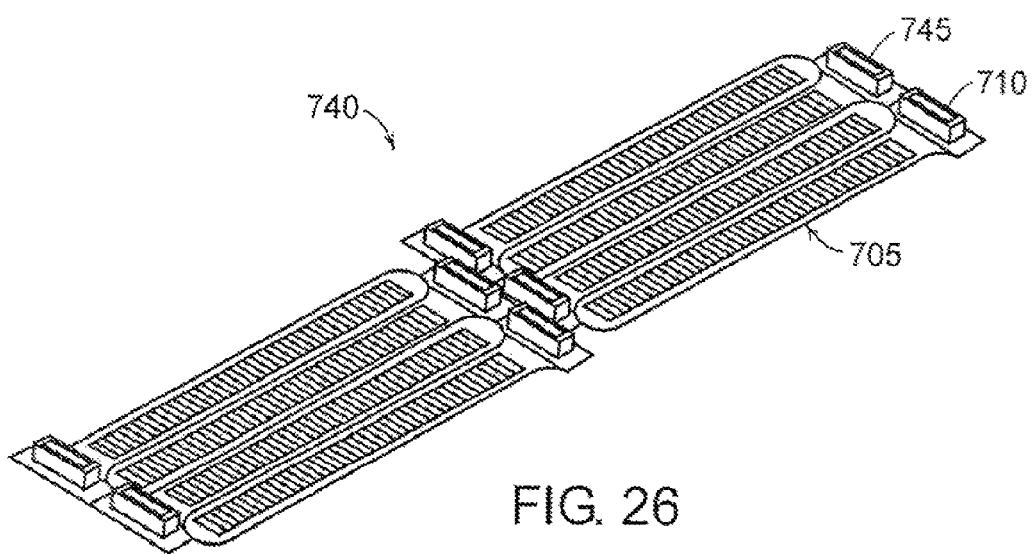
FIG. 26 is a perspective view of a fastener product sheet formed using the mold roll of FIG. 21.
Figure 27:
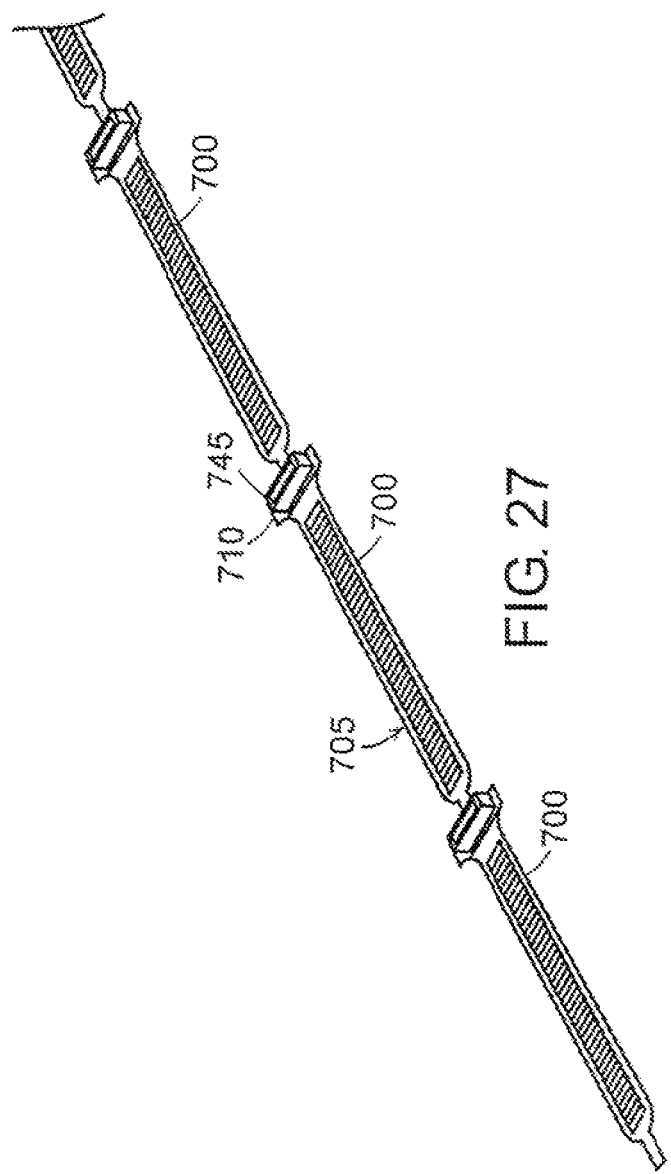
FIG. 27 is a row of longitudinally connected fastener products detached from the fastener sheet of FIG. 26.

Referring to FIG. 26, when implemented into one of the methods and apparatuses described above, the mold roll produces a fastener product sheet 740 that is similar to the sheet 640 shown in FIGS. 19 and 20. However, the lengths of the discrete fastener products 700 are aligned longitudinally along the sheet 740, rather than transversely. The sheet can 740 be separated into the multiple discrete fastener products 700 using any of the methods described above. The sheet can be cut in both the longitudinal and transverse directions to create discrete fastener products. Alternatively, the sheet 740 can be cut only along its length to produce multiple, continuous lengths of longitudinally connected fastener products 700, as shown in FIG. 27, that can be spooled for transportation or retail packaging, for example. The sheet 740 can also be perforated between the longitudinally connected fastener products 700 to allow them to be easily separated into multiple discrete fastener products by a user.

Referring again to FIGS. 21 and 22, the inserts can be interchangeably used in multiple different mold rolls. This can be beneficial for molding straps of different lengths. For example, a mold roll equipped with only one slot for receiving the insert will produce a longer strap than a similarly sized mold roll having multiple slots. Additionally, it is more cost-efficient to provide interchangeable inserts than to provide multiple different mold rolls that define molding recesses in various arrangements.

Figure 23:
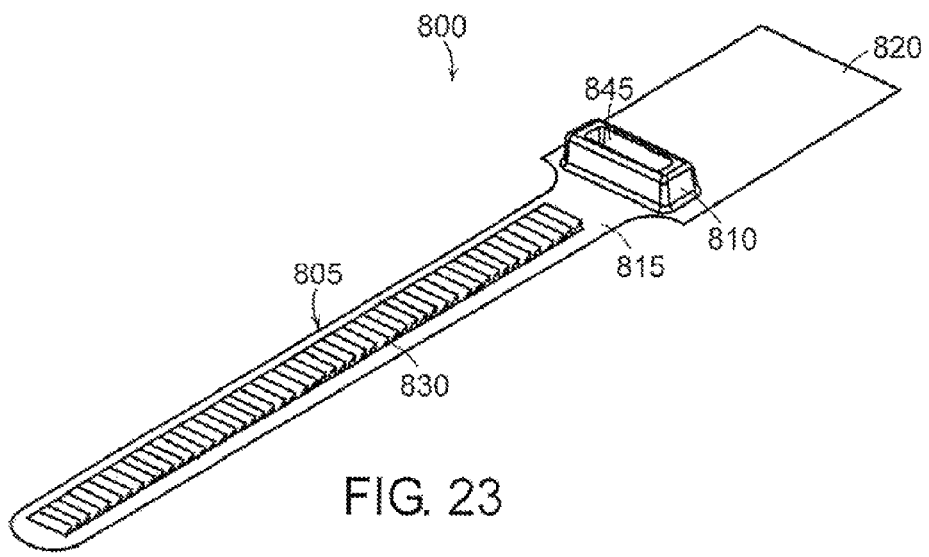
FIG. 23 is a perspective view of another fastener product having a tag.

Other similar fastener products can be molded using the methods and apparatuses discussed above. Referring to FIG. 23, for example, a fastener product 800 includes a tag 820 extending from a head element 810. The fastener product 800 can be made using any off the methods discussed above. An area of the mold roll and pressure roll adjacent the molding recess, which forms the head element 810, can include a relatively smooth portion (i.e., no recesses or cavities) to form the tag 820. The tag 820 can be used to indicate the contents of a bundle retained by the product or the contents of a bag that has been sealed using the product 800, for example. The tag 820 can also be provided with a bar code or an RFID label.

Figure 24:
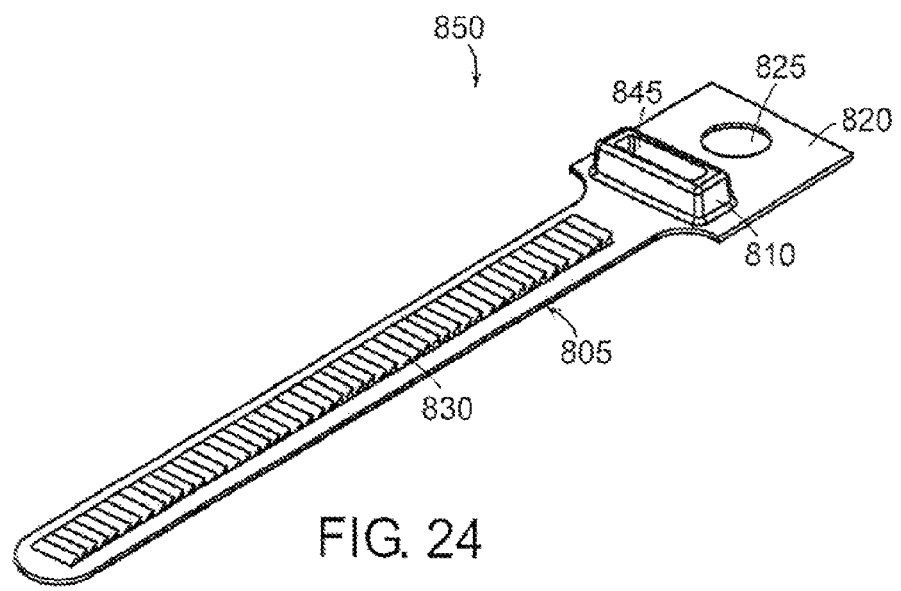
FIG. 24 is a perspective view of another fastener product having a tag with an aperture.

Referring to FIG. 24, a fastener product 850 similarly includes the tag 820. The tag 820 defines an aperture 825, which can be used to hang the product 850 from a hook, for example. The product 850 can be formed using any of the methods discussed above. The aperture 825 can either be molded by a protruding section of the mold roll and/or pressure roll, or it can be cutout by the separating device. Alternatively, the product 850 can be used to retain and secure bundles of wires within electrical boxes, for example. After being wrapped about a bundle of wires a screw or rivet can be inserted through the aperture 825 and attached to an inner wall of the electrical box to secure the product 850 and the wires to the electrical box.

Figure 25:
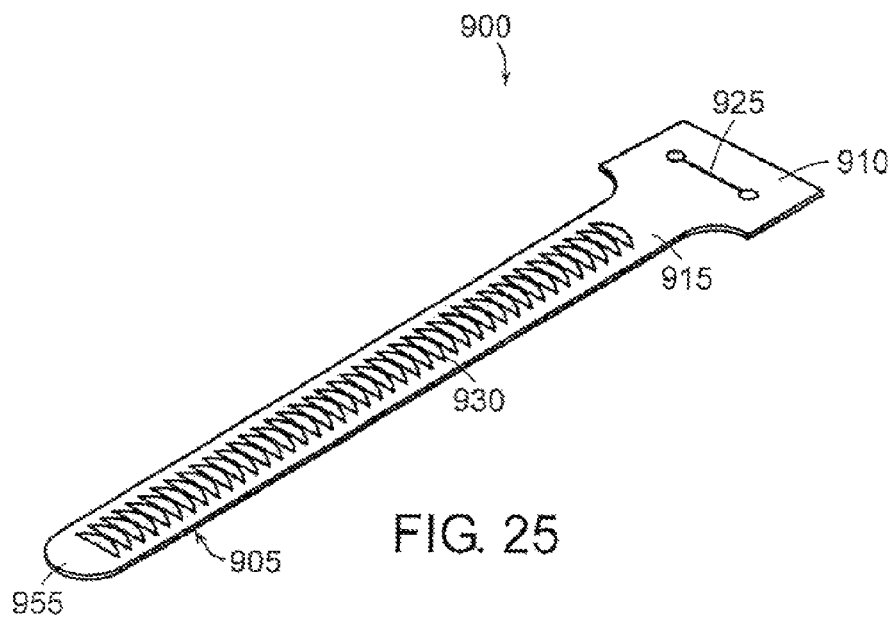
FIG. 25 is a perspective view of another fastener product having a flat head.

Referring to FIG. 25, a fastener product 900 includes a relatively flat head element 910 defining a slot 925. The fastener product 900 operates in a similar manner to the fastener products 600, 650 described above with respect to FIGS. 14 and 16. During use, the free end 955 of the strap 905 is inserted through the slot 925 of the head element 910. The fastener projections 930 are arranged such that a first surface of the projections 930 deflects the head element 910 in a region defining the slot 925, which allows the strap 905 to be pulled through the slot 925 in one direction. If the strap 905 is pulled through the slot 925 in the opposite direction, a second surface of the projection 930 engages with the head element 910 to impede movement of the strap 905 in that direction.

A user may release engagement of the projection 930 by bending the head element 910 back toward the free end of the strap 905, and pulling the strap 905 back through the head element 910. When the head element 910 is bent toward the free end of the strap 905, its angle relative to the projection 930 changes. This allows the head element 910 to disengage the projection 930. As a result the user can pull the strap 905 back through the head element 910.

The product 900 can be formed using a method similar to those methods described above. In order to mold the fastener product 900, the mold roll and the pressure roll can include substantially smooth surfaces in the region in which the flat head element 910 is formed, rather than a recess as described in the methods above. The slot can be created by the separating device, such as by die cutting, or by a relatively sharp protrusion extending from the mold roll and/or the pressure roll. Other suitable means for creating the slot are also contemplated.

Figure 36:
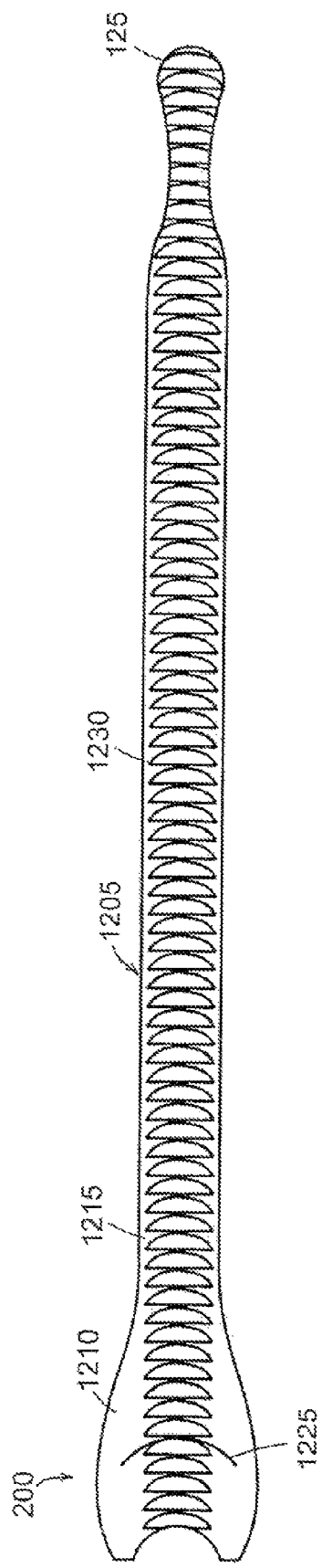
FIG. 36 is a top view of another fastener product.

As shown in FIG. 36, a fastener product 1200 includes a strap 1205 and a relatively flat head element 1210 defining a slot 1225. The head element 1210, like the strap 1205, includes projections 1230 extending from its surface. During use, the fastener product 1200 operates similarly to the fastener product described above with respect to FIG. 25. In particular, the free end 1255 of the strap 1205 is inserted through the slot 1225 defined by the head element 1210. The fastener projections 1230 are arranged such that a first surface of the projections 1230 deflects the head element 1210 in a region defining the slot 1225, which allows the strap 1205 to be pulled through the slot 1225 in one direction. If the strap 1205 is pulled in the opposite direction, a second surface of the projection 1230 engages with the head element 1210 to impede movement of the strap 1205 in that direction.

As discussed above with respect to the fastener product of FIG. 25, the user may release engagement of the projection 1230 by bending the head element 1210 back toward the free end of the strap 1205 and pulling the strap 1205 back through the slot 1225 of the head element 1210.

The fastener product 1200 can be produced using any of various methods similar to those illustrated and described above. The mold roll and pressure roll used in this embodiment do not include molding recesses for forming head elements. Rather, the mold roll and/or the pressure roll used to from the fastener product 1200 include substantially continuous lanes of molding cavities for forming the projections 1230. As a result, a fastener product sheet having substantially continuous rows of projections is produced.

Figure 37:
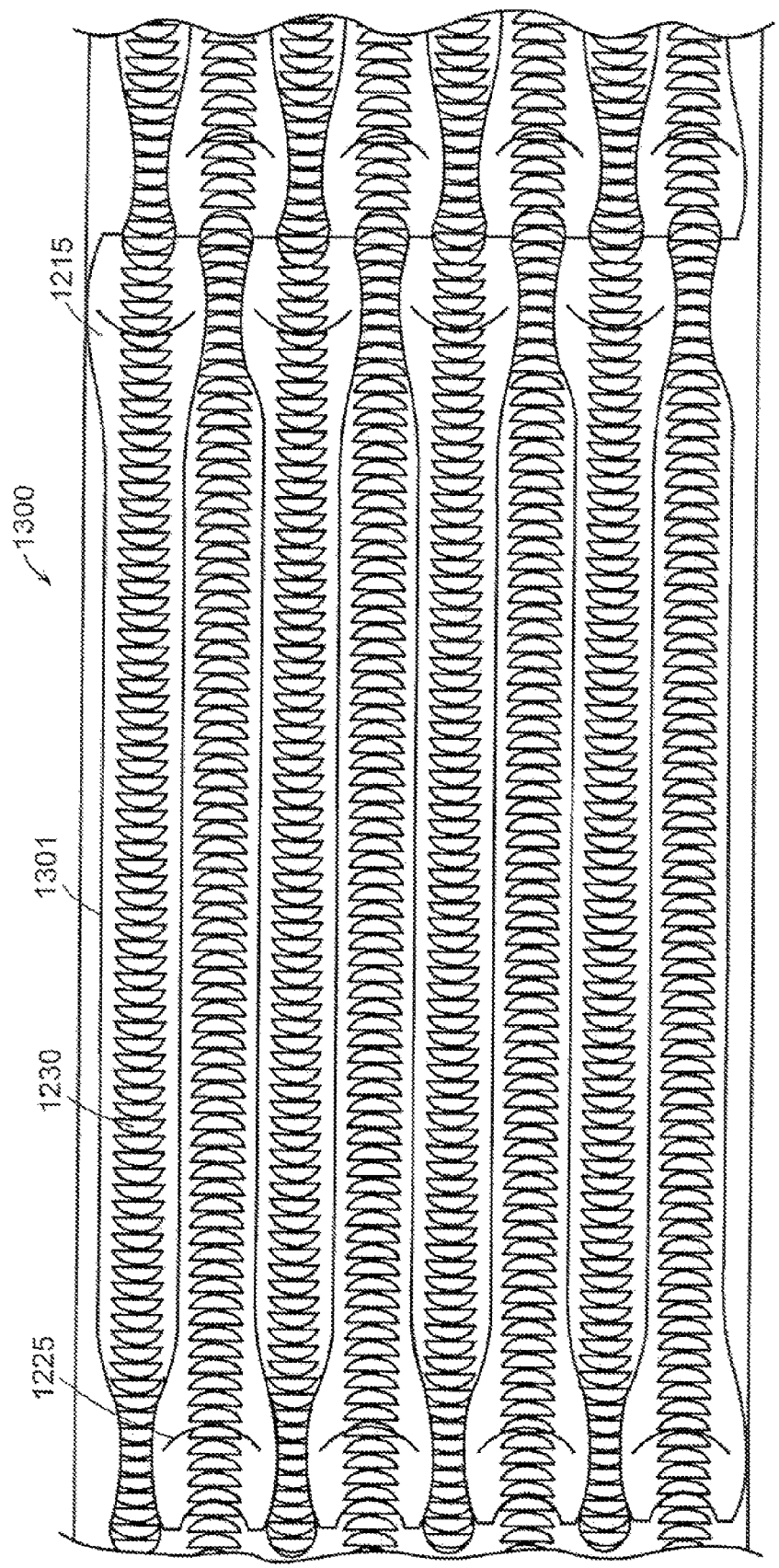
FIG. 37 is a top view of a fastener product sheet that can be separated to produce a plurality of the fastener products of FIG. 35.

FIG. 37 shows a fastener product sheet 1300 produced by the process described above. The fastener product sheet 1300 includes multiple longitudinal lanes of the projections 1230. Separation lines 1301 have been added to show regions where the fastener product sheet 1300 can be separated into multiple fastener products.

Any of the methods described above can be used to separate the fastener product sheet 1300 into multiple fastener products. Similarly, the slots 1225 can be created by any of the various suitable separation methods described above. For example, the fastener products and slots can be created by die cutting, or by a relatively sharp protrusion extending from the mold roll and/or the pressure roll. Other suitable means for creating the fastener products and the slots are also contemplated. As shown in FIG. 37, cuts are made through the base 1215 and the projections 1230 to form the slots 1225. In other embodiments however, cuts can be positioned between the projections 1230 such that only the base 1215 defines the slot 1225.

Because the fastener product sheet 1300 includes continuous rows of the projections 1230, fastener products 1200 of various different sizes and shapes can be created. For example, the separating mechanism can be adjusted to cut fastener products having various different lengths without having to adjust other components used in the molding process.

A number of embodiments of the invention have been described. Nevertheless, it will be understood that various modifications may be made without departing from the spirit and scope of the invention. Accordingly, other embodiments are within the scope of the following claims.

What is claimed is:

1. A fastener product comprising:
an elongate strap comprising a first end, a second end, and a first surface;
an array of projections molded of resin and extending from a first region of the first surface of the strap, the projections being spaced apart in both a longitudinal direction and a transverse direction along the strap;
a head element molded of resin and extending from a second region of the strap, the head element being free of projections and defining a hole sized to receive the second end of the strap; and
a backing material permanently attached to and overlying a back surface of the strap,
wherein the head element is a structure of molded resin that is permanently attached to the backing material in the second region of the strap, the head element has a thickness greater than a thickness of the strap, and the thickness of the head element decreases toward the hole, the thickness of the head element measured along a line extending perpendicular to the first surface of the strap; and
wherein the fastener product is part of a preform fastener product sheet comprising multiples of the fastener product.

2. The fastener product of claim 1, wherein the strap comprises a continuous resin layer interconnecting the projections and the head element.

3. The fastener product of claim 1, wherein the head element and the strap form a unitary structure of molded resin.

4. The fastener product of claim 1, wherein the strap comprises at least one resin region permanently attached to the backing material.

5. The fastener product of claim 4, wherein the projections extend from the at least one resin region.

6. The fastener product of claim 1, wherein the projections comprise a stem portion and a head portion, the head portion overlying the strap.

7. The fastener product of claim 1, further comprising a loop material attached to a front surface of the strap.

8. The fastener product of claim 7, wherein the projections comprise hooks configured to engage the loop material.

9. The fastener product of claim 1, wherein the preform fastener product sheet defines frangible parting lines between adjacent fastener products.

10. The fastener product of claim 1, wherein a portion of the head element adjacent the hole has a circular or elliptical cross-sectional shape.

11. The fastener product of claim 1, wherein the head element is in the form of a D-ring.

12. A fastener product comprising:
an elongate strap comprising a first resin region, a second resin region, a first surface, and a backing material permanently attached to the first and second resin regions;
a plurality of projections molded of resin, the projections being integrally molded with the first region of the strap and extending from the first surface of the strap, and the projections being spaced apart in both a longitudinal direction and a transverse direction along the strap; and
a head element molded of resin and defining a hole sized to receive a free end of the strap, wherein the head element is a structure of molded resin that is permanently attached to the backing material in the second region of the strap, and the head element has a thickness greater than a thickness of the strap, and the thickness of the head element decreases toward the hole, the thickness of the head element measured along a line extending perpendicular to the first surface of the strap; and
wherein the fastener product is part of a preform fastener product sheet comprising multiples of the fastener product.

13. The fastener product of claim 12, wherein the strap comprises a continuous resin layer interconnecting the projections and the head element.

14. The fastener product of claim 12, wherein the preform fastener product sheet defines frangible parting lines between adjacent fastener products.

15. The fastener product of claim 12, wherein a portion of the head element adjacent the hole has a circular or elliptical cross-sectional shape.

16. The fastener product of claim 12, wherein the head element is in the form of a D-ring.

17. A preform fastener product sheet comprising:
a sheet-form base having a top surface;
a lane of first fastener elements extending upwardly from the top surface of the sheet-form base; and
longitudinally spaced apart head elements extending upwardly from the top surface of the sheet-form base, each of the head elements defining an opening, and each of the head elements having a thickness that is greater than a thickness of the sheet-form base, wherein consecutive head elements along the sheet-form base are separated by portions of the sheet-form base, the portions of the sheet-form base that separate the consecutive head elements having a thickness less than the thickness of the consecutive head elements,
the fastener product sheet including multiple regions arranged along a length of the fastener product sheet, each of the regions including one of the head elements and an array of the fastener elements such that each of the regions can be cut from the preform fastener product sheet to form a fastener strap that includes one of the head elements and an array of the fastener elements.

18. The preform fastener product sheet of claim 17, wherein top surfaces of the head elements are angled toward the holes defined by those respective head elements.

19. The preform fastener product sheet of claim 17, wherein portions of the head elements adjacent the holes have circular or elliptical cross-sectional shapes.

20. The preform fastener product sheet of claim 17, wherein each of the head elements is in the form of a D-ring.

21. The preform fastener product sheet of claim 17, wherein the longitudinally spaced apart head elements are located along a first side edge portion of the preform fastener product sheet.

22. The preform fastener product sheet of claim 21, further comprising additional longitudinally spaced apart head elements located along a second side edge portion of the preform fastener product sheet.

23. The preform fastener product sheet of claim 17, wherein a longitudinally adjacent pair of the head elements are separated by a portion of the sheet-form base that is configured to form a free end of a fastener strap, the pair of head elements each having a thickness that is greater than a thickness of the portion of the sheet-form base that separates the pair of head elements.

24. The preform fastener product sheet of claim 17, wherein the fastener product sheet includes a first region having a first head element and a first array of the fastener elements, a second region having a second head element and a second array of the fastener elements, and a third region having a third head element and a third array of the fastener elements, the third region being located between the first and second regions, and the first, second, and third regions being configured to form first, second, and third fastener straps, respectively, when those regions are cut from the fastener product sheet.

25. The preform fastener product sheet of claim 24, wherein an end portion of the third region is located between the first and second head elements and is configured to form a free end of the third fastener strap.

26. The preform fastener product sheet of claim 24, wherein end portions of the first and second regions opposite the first and second head elements are configured to form free ends of the first and second straps, and the third region includes a third head element located between the free ends of the first and second regions.

27. The preform fastener product sheet of claim 17, wherein the preform fastener product sheet includes multiple lanes of fastener elements extending from the sheet-form base.

28. The preform fastener product sheet of claim 27, wherein a first lane of fastener elements extends from a central region of the sheet-form base, and a second lane of fastener elements extends from a portion of the sheet-form base located between the central region of the sheet-form base and a first edge region of the sheet-form base from which the longitudinally spaced apart head elements extend.

29. The preform fastener product sheet of claim 28, wherein the first lane of fastener elements includes hook-engageable loops, and the second lane of fastener elements includes loop-engageable hooks.

30. The preform fastener product sheet of claim 28, wherein the second lane of fastener elements is a continuous lane.

31. The preform fastener product sheet of claim 28, wherein the second lane of fastener elements is a discontinuous lane that includes spaces free of fastener elements located between longitudinally spaced apart groupings of fastener elements.

32. The preform fastener product sheet of claim 28, further comprising a third lane of fastener elements that extends from a portion of the sheet-form base located between the central region of the sheet-form base and a second edge region of the sheet-form base from which additional longitudinally spaced apart head elements extend.

* * * * *

UNITED STATES PATENT AND TRADEMARK OFFICE
CERTIFICATE OF CORRECTION

PATENT NO. : 8,413,306 B2  
APPLICATION NO. : 11/762401  
DATED : April 9, 2013  
INVENTOR(S) : Christopher M. Gallant et al.

Page 1 of 1

It is certified that error appears in the above-identified patent and that said Letters Patent is hereby corrected as shown below:

Specification

Col. 1, line 10, "20041" should be --2004--;

Col. 1, line 11, "Provisional." should be --Provisional--;

Claims

Col. 28, line 2, Claim 12, "strap, and" should be --strap,--.

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,413,306 B2 | Page 1 of 1 |
| APPLICATION NO. | : 11/762401 | |
| DATED | : April 9, 2013 | |
| INVENTOR(S) | : Gallant et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this
Seventeenth Day of February, 2015

Michelle K. Lee
*Deputy Director of the United States Patent and Trademark Office*